US012481029B2

(12) United States Patent
Watson et al.

(10) Patent No.: US 12,481,029 B2
(45) Date of Patent: Nov. 25, 2025

(54) SPLIT WINDOW AND BAFFLING

(71) Applicant: Waymo LLC, Mountain View, CA (US)

(72) Inventors: Jason Watson, San Jose, CA (US); David Duff, Portola Valley, CA (US); Justin Andrade, San Jose, CA (US); Blaise Gassend, East Palo Alto, CA (US); Alex Bogatko, Mountain View, CA (US); Alex Rivas, Sunnyvale, CA (US); Michael Brickner, Mountain View, CA (US); Yeh-Jiun Tung, Sunnyvale, CA (US); Hui Son, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 1008 days.

(21) Appl. No.: 17/645,615

(22) Filed: Dec. 22, 2021

(65) Prior Publication Data

US 2023/0194669 A1 Jun. 22, 2023

(51) Int. Cl.
*G01S 7/48* (2006.01)
*G01S 7/481* (2006.01)

(52) U.S. Cl.
CPC .......... *G01S 7/4813* (2013.01); *G01S 7/4812* (2013.01); *G01S 7/4817* (2013.01)

(58) Field of Classification Search
CPC ..... G01S 7/00; G01S 7/10; G01S 7/42; G01S 7/931; G01S 7/4811; G01S 7/4812;
(Continued)

(56) References Cited

U.S. PATENT DOCUMENTS

| 6,285,476 B1 | 9/2001 | Carlson et al. |
| 9,871,971 B2 | 1/2018 | Wang et al. |

(Continued)

FOREIGN PATENT DOCUMENTS

| CN | 109991588 | 7/2019 |
| JP | 07-301519 A | 11/1995 |

(Continued)

OTHER PUBLICATIONS

Kaifler et al., "A technical description of the Balloon Lidar Experiment (BOLIDE)," European Geosciences Union, Oct. 26, 2020, pp. 681-5695, Atmos. Meas. Tech., vol. 13, No. 5.

(Continued)

*Primary Examiner* — Sultan Chowdhury
(74) *Attorney, Agent, or Firm* — McDonnell Boehnen Hulbert & Berghoff LLP

(57) ABSTRACT

An example lidar system includes a housing defining an interior space. The housing includes at least one optical window. The lidar system also includes a rotatable mirror assembly disposed within the interior space. The rotatable mirror assembly includes a transmit mirror portion and a receive mirror portion. The lidar system additionally includes a transmitter disposed within the interior space. The transmitter is configured to emit emission light into an environment of the lidar system along a transmit path. The lidar system also includes a receiver disposed within the interior space. The receiver is configured to detect return light that is received from the environment along a receive path. The lidar system additionally includes at least one optical baffle configured to minimize stray light in the interior space.

20 Claims, 26 Drawing Sheets

(58) Field of Classification Search
CPC ..... G01S 7/4813; G01S 7/4817; G02B 26/12; G02B 26/26; G02B 27/0955; G02B 27/0972; G02B 27/0101
See application file for complete search history.

(56) References Cited

U.S. PATENT DOCUMENTS

| | | | |
|---|---|---|---|
| 10,001,551 | B1 | 6/2018 | Gassend et al. |
| 10,340,651 | B1 | 7/2019 | Drummer et al. |
| 10,401,480 | B1 * | 9/2019 | Gaalema ............... G01S 17/931 |
| 10,802,120 | B1 * | 10/2020 | LaChapelle ........... G01S 7/4917 |
| 2011/0255070 | A1 | 10/2011 | Phillips et al. |
| 2019/0242981 | A1 | 8/2019 | Otani et al. |
| 2019/0257922 | A1 | 8/2019 | McCord et al. |
| 2019/0310351 | A1 * | 10/2019 | Hughes ................ G02B 26/101 |
| 2020/0132851 | A1 | 4/2020 | Gassend et al. |
| 2020/0141716 | A1 * | 5/2020 | Droz .................... G01S 7/4813 |
| 2020/0142036 | A1 | 5/2020 | Karplus et al. |
| 2020/0142064 | A1 * | 5/2020 | Davis .................... G02B 26/12 |
| 2020/0348397 | A1 | 11/2020 | Yamamoto |
| 2021/0124018 | A1 * | 4/2021 | Gassend ................ G01S 7/481 |
| 2021/0199770 | A1 | 7/2021 | Gassend et al. |
| 2021/0199779 | A1 | 7/2021 | Gassend et al. |
| 2021/0199801 | A1 | 7/2021 | Karplus et al. |
| 2021/0199806 | A1 | 7/2021 | Watson et al. |

FOREIGN PATENT DOCUMENTS

| | | |
|---|---|---|
| JP | 2004151069 A | 5/2004 |
| JP | 2019128236 A | 8/2019 |
| JP | 2019138675 A | 8/2019 |
| WO | 2020/180954 | 9/2020 |
| WO | 2021050233 A1 | 3/2021 |

OTHER PUBLICATIONS

Pereira Do Carmo et al., "Altid, ESA atmospheric lidar: manufacture and test results of instrument units," ICSO 2016 International Conference on Space Optics, Biarritz, France, Oct. 18-21, 2016, 9 pages.
Japanese Patent Office, Office Action mailed Dec. 25, 2023, issued in connection with Japanese Patent Application No. 2022197747, 13 pages (with English Translation).
European Patent Office, Extended European Search Report mailed on Jul. 20, 2023, issued in connection with European Patent Application No. 22215119.3, 14 pages.

* cited by examiner

Section A-A

Section A-A

Section A-A

Section A-A

SPLIT WINDOW AND BAFFLING

BACKGROUND

Light detection and ranging (lidar) systems may be used to determine ranges to objects in an environment. Such range information can be aggregated into a dynamic "point cloud" that can be used for object detection, object avoidance, and/or navigation, for example. In an example application, lidar systems may be utilized by an autonomous vehicle to identify objects, such other vehicles, roadways, signs, pedestrians, buildings, etc.

Conventional lidar systems can be adversely affected by stray light, such as when stray light from the environment impinges on photodetectors of a lidar receiver module. Stray light can also take the form of optical cross-talk, which may include light emitted by a transmitter module that might be inadvertently directed back into the receiver module via an internal optical path (e.g., without interaction with an external environment of the lidar). In such scenarios, stray environmental light and/or optical cross-talk may render lidar systems ineffective and/or cause the lidar systems to provide incorrect or inaccurate information about objects in the environment. Accordingly, improved systems and methods that may help mitigate the effects of stray light and/or optical cross-talk in lidar systems are desired.

SUMMARY

The present disclosure relates to lidar systems that may be configured to receive range and amplitude information about objects in the environment. Such range information could be used to form a point cloud. In example embodiments, the lidar systems could include various combinations of optical windows and/or optical baffles disposed and arranged to mitigate stray light and optical cross-talk. In some examples, such embodiments could include lidar systems configured to be utilized with self-driving vehicles (e.g., semi- or fully-autonomous vehicles).

In a first aspect, a light detection and ranging (lidar) system is provided. The lidar system includes a housing defining an interior space. The housing includes at least one optical window. The lidar system also includes a rotatable mirror assembly disposed within the interior space. The rotatable mirror assembly includes a transmit mirror portion and a receive mirror portion. The lidar system additionally includes a transmitter disposed within the interior space. The transmitter is configured to emit emission light into an environment of the lidar system along a transmit path. The transmit path includes the transmit mirror portion and at least a first portion of the at least one optical window. The lidar system also includes a receiver disposed within the interior space. The receiver is configured to detect return light that is received from the environment along a receive path. The receive path includes at least a second portion of the at least one optical window and the receive mirror portion. The lidar system also includes at least one optical baffle configured to minimize stray light in the interior space.

In a second aspect, a vehicle is provided. The vehicle includes at least one light detection and ranging (lidar) system. The lidar system includes a housing defining an interior space. The housing includes at least one optical window. The lidar system also includes a rotatable mirror assembly disposed within the interior space. The rotatable mirror assembly further includes a transmit mirror portion and a receive mirror portion. The lidar system also includes a transmitter disposed within the interior space. The transmitter is configured to emit emission light into an environment of the vehicle along a transmit path. The transmit path includes the transmit mirror portion and a first portion of the at least one optical window. The lidar system also includes a receiver disposed within the interior space. The receiver is configured to detect return light that is received from the environment along a receive path. The receive path additionally includes a second portion of the at least one optical window and the receive mirror portion. The lidar system further includes at least one optical baffle configured to minimize stray light in the interior space.

Other aspects, embodiments, and implementations will become apparent to those of ordinary skill in the art by reading the following detailed description, with reference where appropriate to the accompanying drawings.

DETAILED DESCRIPTION

Figure 1:
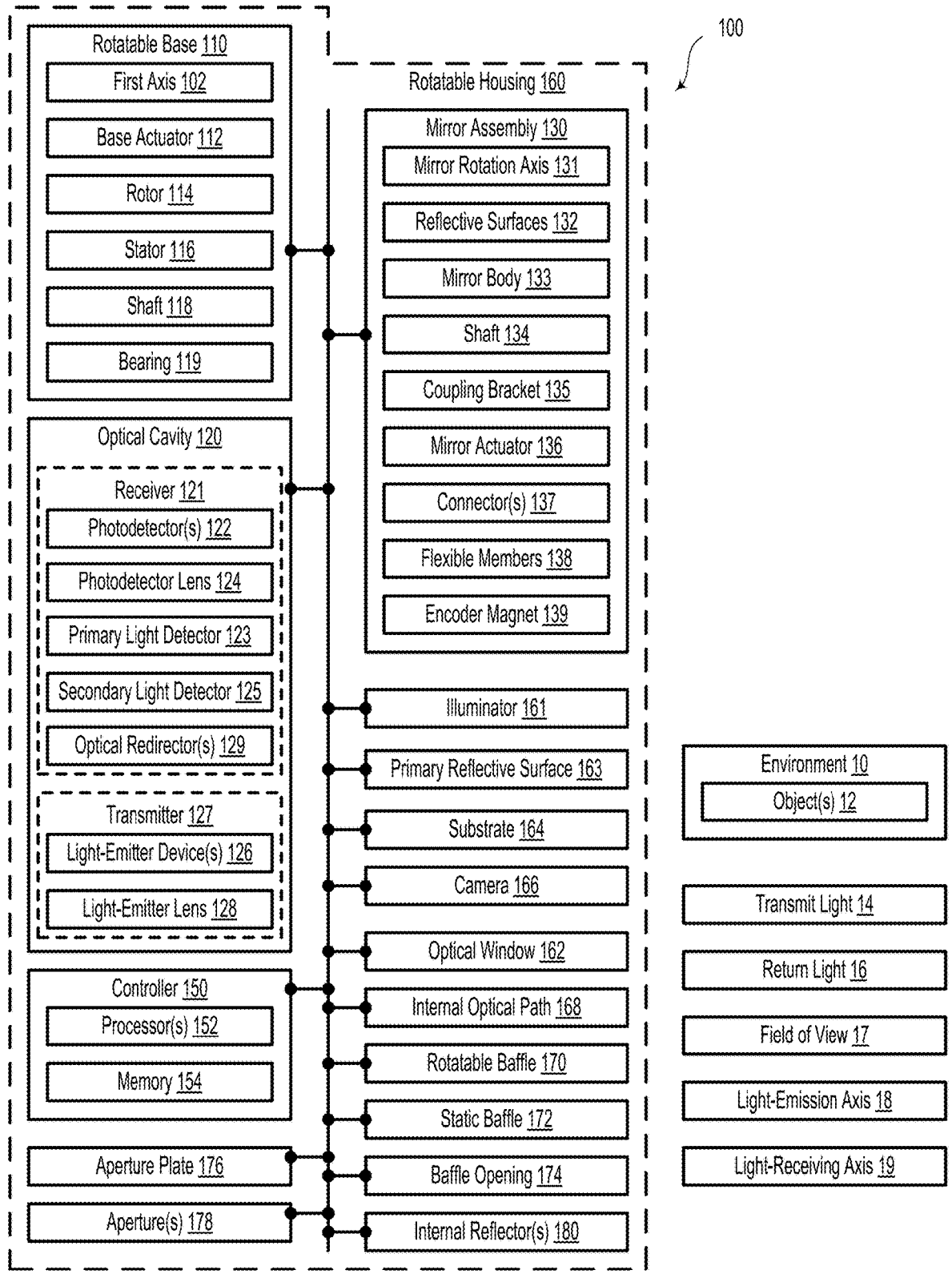
FIG. 1 illustrates a lidar system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

An optical system includes at least one light emitter, a movable reflective surface, and an optical window. In an example embodiment, at least one light emitter could be configured to emit light pulses toward the movable reflective surface. A position and/or an orientation of the movable reflective surface could be configured to adjust an emission path of the emitted light pulses. In some examples, the movable reflective surface could include a rotatable mirror assembly. For example, the rotatable mirror assembly could be configured to rotate about a first axis (e.g., a horizontal axis, etc.). In such scenarios, the rotating mirror assembly could rotate so as to adjust an angle of an emission path of the emitted light pulses. That is, as emitted light pulses interact with the rotating mirror assembly, they may provide an emission path that can be swept through a range of elevation angles.

At least a portion of the emitted light pulses may be transmitted through the optical window. In some examples, the optical window could include a first window portion and a second window portion. In some examples, the first window portion could be oriented along a first plane and the second window portion could be oriented along a second plane. For example, the first window portion and the second window portion could be arranged like separate window panes that are angled with respect to one another. In some embodiments, the optical window could be formed from borosilicate glass (e.g., BOROFLOAT®) or another optical material. In some examples, a mechanical support member may separate the first window portion and the second window portion. In such scenarios, the mechanical support member could include a physically thicker member configured to provide physical protection for the optical window.

In example embodiments, the first window portion and the second window portion could be glued or otherwise bonded to a window frame attached to a housing of the optical system. In some examples, the first window portion and the second window portion could be defined by one or more straight or offset cuts in one or both surfaces of the optical window. In various embodiments, the straight or offset cuts could be filled, at least in part, with an optically absorbing material, such as black optical paint or a black coating.

The optical system may additionally include one or more optical baffles configured to block undesirable stray light. In such embodiments, the one or more optical baffles could include a static baffle; and a rotating baffle coupled to the rotatable mirror assembly. In various examples, the static baffle and rotating baffle could be shaped so as to prevent stray light from interacting with an optical cavity of the optical system. Additionally or alternatively, the static baffle and rotating baffle could form a tortuous path, which may be beneficial to preventing light spill/stray light from passing through a gap between the static baffle and rotating baffle. In some examples, at least one baffle could include a rounded edge or bolus edge which may further reduce the amount of stray light that can pass around the baffle edge. In some examples, the optical system may include a rotating portion configured to rotate about a housing. At least one baffle could include a rounded edge that is configured to virtually touch the housing so as to minimize or eliminate stray light from passing around the baffle.

Additionally, in some embodiments, the optical system may include a transverse baffle that is connected to and extends outward from a static baffle (e.g., a static baffle used to separate a transmit side and a receive side of the optical system, etc.). The transverse baffle may be made of one or more elastomers. Further, the transverse baffle may be shaped like a blade in some embodiments. For example, the transverse baffle may include one or more sharp edges (e.g., to allow the transverse baffle to be positioned relatively close to one or more other components of the optical system, etc.). In some embodiments, the transverse baffle may extend outward from a location of the static baffle such that there is only a very small separation between the transverse baffle and one or more optical windows. This may effectively provide a seal between the transverse baffle and the optical window(s) such that significant light cannot pass between the transverse baffle and the optical window(s) (e.g., may result in a tortuous path between the transverse baffle and the optical window(s), etc.). In some embodiments, the transverse baffle may actually be attached to/adhered to the optical window(s), thereby resulting in a total blockage of any optical paths that would otherwise exist between the transverse baffle and the optical window(s). Such transverse baffles may further reduce the number of paths that undesirable stray light can take to the detectors, thereby further reducing the amount of noise in the system. In addition, in some embodiments, the transverse baffle may be sized to further reduce light transmission that occurs between the static baffle and one or more of the rotatable baffles. In some embodiments, at least a portion of the internal elements of the optical system could be configured to rotate with respect to a static optical window of the housing. In such scenarios, the optical window could include a cylindrical shape and/or a hemispherical shape disposed about the rotatable mirror assembly. As such, an edge of the transverse baffle could be disposed with a small gap away from the optical window.

FIG. 1 illustrates a light detection and ranging (lidar) system 100, according to an example embodiment. In such scenarios, the lidar system 100 could be configured to emit light pulses into an environment 10 so as to provide information indicative of objects 12 within a field of view 17. In specific embodiments, the lidar system 100 could provide lidar functionality for a vehicle that is configured to operate in a semi- or fully-autonomous mode. More specifically, the vehicle may operate in a fully-autonomous mode without human interaction through receiving control instructions from a computing system. As part of operating in the autonomous mode, the vehicle may use sensors to detect and possibly identify objects 12 in the environment 10 to enable safe navigation. Additionally, the vehicle may operate in a semi-autonomous mode in which some functions of the vehicle are controlled by a human driver of the vehicle and some functions of the vehicle are controlled by the computing system. For example, the vehicle may also include subsystems that enable the driver to control operations of vehicle such as steering, acceleration, and braking, while the computing system performs assistive functions such as lane-departure warnings/lane-keeping assist or adaptive cruise control based on objects 12 in the environment 10.

As described herein, lidar system 100 could be coupled to a vehicle so as to provide information about the vehicle's external environment (i.e. environment 10). Such a vehicle can include motor vehicles (e.g., cars, trucks, buses, motorcycles, all-terrain vehicles, recreational vehicle, any specialized farming or construction vehicles, etc.), aircraft (e.g., planes, helicopters, drones, etc.), naval vehicles (e.g., ships, boats, yachts, submarines, etc.), or any other self-propelled vehicles (e.g., robots, factory or warehouse robotic vehicles, sidewalk delivery robotic vehicles, etc.) capable of being operated in a semi- or fully-autonomous mode (as described herein) to navigate its environment 10. As described herein, the environment 10 could include an interior or exterior environment, such as inside a building or outside of the building. Additionally or alternatively, the environment 10 could include a vicinity around and/or on a roadway. Furthermore, the environment 10 could include objects 12. Examples of objects 12 include, but are not limited to, other vehicles, traffic signs, pedestrians, bicyclists, roadway surfaces, buildings, terrain, etc. Additionally or alternatively, the environment 10 could include the interior of the semi- or fully-autonomous vehicle. In some embodiments, the lidar system 100 could be configured to obtain point cloud information that could include information indicative of a plurality of points in specific locations in three-dimensional space. As an example, the point cloud information could indicate the location of objects 12 in the environment 10.

Lidar system 100 includes a rotatable base 110 configured to rotate about a first axis 102. In some embodiments, a base actuator 112 could be operable to rotate the rotatable base 110 about the first axis 102 at an azimuthal rotational rate between 3 Hertz and 60 Hertz (e.g., between 180 revolutions per minute (RPM) and 3600 RPM, etc.). However, other azimuthal rotational rates are possible and contemplated. In some embodiments, the base actuator 112 could be controlled by the controller 150 to rotate at a desired rotational rate. In such scenarios, the controller 150 could control the base actuator 112 to rotate at a single target rotational rate and/or the controller 150 could dynamically adjust a desired rotational rate of the base actuator 112 within a range of possible rotational rates.

In some embodiments, the base actuator 112 could include an electric motor. For example, the electric motor could include a stator 116 and a rotor 114 that could be operable to rotate a shaft 118 of the rotatable base 110. In various embodiments, the base actuator 112 could be a direct current (DC) motor, a brushless motor, or another type of rotational actuator. In some embodiments, the shaft 118 could be coupled to the rotatable base 110 by way of one or more bearings 119. Bearings 119 could include a rotational bearing or another type of low-friction bearing.

In some embodiments, lidar system 100 need not include a rotatable base 110. In such scenarios, one or more elements of the lidar system 100 within housing 160 may be configured to rotate about the first axis 102. However, in other cases, some elements of the lidar system 100 need not rotate about the first axis 102. Accordingly, in such embodiments, lidar system 100 could be utilized in line-scanning applications, single-point scan applications, among other possibilities.

The lidar system 100 also includes a mirror assembly 130 with shaft 134 and a mirror body 133 that is configured to rotate about a mirror rotation axis 131. In some embodiments, the mirror rotation axis 131 could be substantially perpendicular to the first axis 102 (e.g., within 0 to 10 degrees of perpendicular, etc.). In an example embodiment, a mirror actuator 136 could be configured to rotate the mirror body 133 about the mirror rotation axis 131 at a mirror rotational rate between 100 Hz to 1000 Hz (e.g., between 6,000 RPM and 60,000 RPM, etc.). In some contexts, the mirror body 133 could be configured to rotate about the mirror rotation axis 131 within a period of rotation (e.g., between 3.3 milliseconds and 1 millisecond, etc.).

The mirror actuator 136 could be a DC motor, a brushless DC motor, an AC motor, a stepper motor, a servo motor, or another type of rotational actuator. It will be understood that the mirror actuator 136 could be operated at various rotational speeds or at a desired rotational speed, and that the mirror actuator 136 could be controlled by the controller 150.

In example embodiments, the mirror assembly 130 includes a plurality of reflective surfaces 132. For example, the plurality of reflective surfaces 132 could include four reflective surfaces (e.g., reflective surface 132a, 132b, 132c, 132d, etc.). In various embodiments, the reflective surfaces 132 could be formed from at least one of: gold, silicon oxide, titanium oxide, titanium, platinum, or aluminum. In such scenarios, the four reflective surfaces could be arranged symmetrically about the mirror rotation axis 131 such that a mirror body 133 of the mirror assembly 130 has a rectangular prism shape. It will be understood that the mirror assembly 130 could include more or less than four reflective surfaces. Accordingly, the mirror assembly 130 could be shaped as a multi-sided prism shape having more or less than four sides. For example, the mirror assembly 130 could have three reflective surfaces. In such scenarios, the mirror body 133 could have a triangular cross-section.

In some embodiments, the mirror body 133 could be configured to couple the plurality of reflective surfaces 132 to the shaft 134. In such scenarios, the mirror body 133 could be substantially hollow. In various embodiments, at least a portion of the mirror body 133 could have an octagonal cross-section and/or a four-fold symmetry. In one example, mirror body 133 may include a polycarbonate material. In this example, an octagonal and/or four-fold symmetry configuration for mirror body 133 may facilitate reducing potential slippage of the polycarbonate material of the mirror body 133 on the shaft 134 during rotation of the mirror body. Other examples are possible as well.

In some embodiments, the mirror body 133 could include a plurality of flexible support members 138. In such scenarios, at least one flexible support member 138 could be straight. Additionally or alternatively, at least one flexible support member 138 could be curved. In some embodiments, based on a geometry of the system of flexible support members, the mirror body 133 could be stiff in some directions (e.g., to transfer load, etc.) and elastic in some directions to accommodate thermal expansion. For example, the flexible support members 138 could be configured to be substantially stiff when in torsion and substantially elastic in response to forces perpendicular to the rotational axis. In various embodiments, the mirror body 133 could be formed from an injection molded material, such as a plastic material. Furthermore, the shaft 134 could be formed from steel or another structural material.

In such scenarios, the mirror assembly 130 could include an encoder magnet 139, which could be coupled to the shaft 134. In such scenarios, the encoder magnet 139 is configured to provide information indicative of a rotational position of the rotatable mirror assembly 130 with respect to the transmitter 127 and the receiver 121.

In some embodiments, encoder magnet 139 may also be configured as a mirror motor magnet (e.g., included in mirror actuator 136, etc.). In these embodiments, lidar system 100 may use magnet 139 to facilitate both measuring and adjusting the rotational position of the rotatable mirror assembly 130. In one example embodiment, magnet 139 may be one of a plurality of magnets (e.g., magnet ring, etc.) disposed in a circular arrangement and configured to interact with a magnetic field (e.g., generated at actuator 136, etc.) to cause the rotation of the mirror assembly. Other embodiments are possible.

In various examples, the mirror assembly 130 could additionally or alternatively include a coupling bracket 135 configured to couple at least a portion of the mirror assembly 130 to the other elements of lidar system 100, such as housing 160. The coupling bracket 135 could be configured to attach the mirror assembly 130 to the housing 160 by way of one or more connectors 137. In such scenarios, the coupling bracket 135 and the connectors 137 could be configured to be easily removable from other elements of the lidar system 100. Such ease of removability could provide better recalibration, service, and/or repair options.

The lidar system 100 additionally includes an optical cavity 120 coupled to the rotatable base 110. The optical cavity includes a transmitter 127 having at least one light-emitter device 126 and a light-emitter lens 128. In example embodiments, the at least one light-emitter device 126 could include one or more laser diodes (e.g., semiconductor laser bars, etc.), light-emitting diodes (LEDs), or other types of devices configured to emit light in discrete light pulses. In an example embodiment, the light pulses could be emitted in an adjustable and/or controllable manner. Optionally, the plurality of light-emitter devices 126 could include an array of vertical-cavity surface-emitting lasers (VCSELs). However, other types of light-emitter devices are possible and contemplated. In some embodiments, the light-emitter devices 126 could be configured to emit light with wavelength around 905 nm. It will be understood that other emission wavelengths are possible and contemplated. The at least one light-emitter device 126 and the light-emitter lens 128 are arranged so as to define a light-emission axis 18.

In various embodiments, the rotatable mirror assembly 130 could be configured to controllably rotate about the mirror rotation axis 131 so as to transmit emission light toward, and receive return light from, locations within the environment 10.

The optical cavity 120 also includes a receiver 121 configured to detect return light 16 from the environment 10. In various embodiments, the receiver 121 could include a bandpass filter configured to transmit light within a predetermined wavelength band (e.g., infrared light between 800-1600 nanometers, etc.). The receiver 121 includes a plurality of photodetectors 122. As an example, the plurality of photodetectors 122 could include at least one solid-state single-photon-sensitive device, a plurality of single photon avalanche detectors (SPADs), and/or silicon photomultiplier (SiPM) devices. Other types of image sensors and photodetector devices are possible and contemplated. For example, in some embodiments, the plurality of photodetectors 122 could include one or more silicon photomultipliers (SiPMs). In such scenarios, the SiPMs could each include a plurality (e.g., a two-dimensional array, etc.) of single-photon avalanche diodes (SPADs). Additionally or alternatively, the plurality of photodetectors 122 could include an avalanche photodiode (APD), an infrared photodiode, photoconductor, a PIN diode, or another type of photodetector. Additionally, it will be understood that systems incorporating multiple photodetectors, such as a focal plane array or another type of image sensor, are also possible and contemplated.

In various embodiments, the plurality of photodetectors 122 could include an array of detector elements that form at least one macropixel. In some examples, a macropixel could include a plurality of detector elements that are physically adjacent and/or associated with one another. In such scenarios, a macropixel could form a large area detector compared to the area of an individual detector element. Systems and methods could relate to examples including a single light-emitter device (e.g., 1 transmitter or 1 Tx, etc.) that can be utilized with N detectors (or macropixels) (e.g., N receivers or N Rx, etc.). However, it will be understood that disclosed systems and methods could include N Tx to N Rx (e.g., each Tx channel corresponds to an Rx channel, etc.) or N Tx to M Rx, where M is greater than N. Other configurations and arrangements of Tx and Rx elements are contemplated and possible.

The plurality of photodetectors 122 includes a respective set of two or more photodetectors for each light-emitter device of the at least one light-emitter device 126. In various embodiments, the at least one light-emitter device 126 could be configured to emit light pulses that interact with the mirror assembly 130 such that the light pulses are redirected toward an environment 10 of the system 100 as transmit light 14. In such scenarios, at least a portion of the light pulses could be reflected back toward the system 100 as return light 16 and received by the plurality of photodetectors 122 so as to determine at least one of: a time of flight, a range to an object 12, and/or a point cloud.

In example embodiments, the photodetectors 122 could provide an output signal to the controller 150. For example, the output signal could include information indicative of a time of flight of a given light pulse toward a given portion of the field of view 17 of the environment 10. Additionally or alternatively, the output signal could include information indicative of at least a portion of a range map or point cloud of the environment 10.

In some embodiments, each set of two or more photodetectors could include a primary light detector 123 and a secondary light detector 125. The primary light detector 123 is configured to receive a first portion of return light 16 corresponding to light pulses emitted from a given light-emitter device. In such scenarios, the secondary light detector 125 is configured to receive a second portion of return light emitted from the given light-emitter device.

In various embodiments, the first portion of the return light 16 and the second portion of the return light 16 could have widely different intensities. For example, the first portion of the return light 16 could be at least an order of magnitude greater in photon flux than the second portion of the return light 16.

In an example embodiment, the at least one light-emitter device 126 could include a four-element laser diode bar (e.g., four discrete light sources disposed on a laser bar, etc.). In such scenarios, the plurality of photodetectors 122 could include four primary light detectors (e.g., primary light detector 123a, 123b, 123c, 123d, etc.). Each primary light detector could correspond to a respective light-emitter on the laser diode bar. Additionally, the plurality of photodetectors 122 could include four secondary light detectors (e.g., second light detector 125a, 125b, 125c, 125d, etc.). Each secondary light detector could correspond to a respective light-emitter on the laser diode bar.

In alternate embodiments, the at least one light-emitter device 126 may include two or more laser diode bars, and a laser bar may include more or fewer than four light-emitter devices.

In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared light (e.g., light having a wavelength between 800-1600 nanometers (nm), such as 905 nm, etc.). However, other wavelengths of light are possible and contemplated.

The receiver 121 also includes a photodetector lens 124. The plurality of photodetectors 122 and the photodetector lens 124 are arranged so as to define a light-receiving axis 19.

The receiver 121 additionally includes a plurality of apertures 178, which may be openings in an aperture plate 176. In various embodiments, the aperture plate 176 could have a thickness between 50 microns and 200 microns. Additionally or alternatively, at least one aperture of the plurality of apertures 178 may have a diameter between 150 microns and 300 microns. However, other aperture sizes, larger and smaller than this range, are possible and contemplated. Furthermore, in an example embodiment, the respective apertures of the plurality of apertures 178 could be spaced apart by between 200 microns and 800 microns. Other aperture spacings are possible and contemplated.

The receiver 121 could also include one or more optical redirectors 129. In such a scenario, each optical redirector 129 could be configured to optically couple a respective portion of return light 16 from a respective aperture to at least one photodetector of the plurality of photodetectors 122. For example, each optical redirector could be configured to optically couple a respective portion of return light from a respective aperture to at least one photodetector of the plurality of photodetectors by total internal reflection.

In some embodiments, the optical redirectors 129 could be formed from an injection-moldable optical material. In such scenarios, the optical redirectors 129 are coupled together in element pairs such that a first element pair and a second element pair are shaped to engage and/or interlock with one another. In example embodiments, the optical redirectors 129 are configured to separate the return light 16 into unequal portions so as to illuminate a first photodetector with a first photon flux of a first portion of the return light 16 and illuminate a second photodetector with a second photon flux of a second portion of the return light 16. In some embodiments, one or more surfaces of the optical redirectors 129 could be coated or shaped so as to suppress or eliminate cross-talk between receiver channels. As an example, one or more surfaces of the optical redirectors 129 could be coated with an opaque optical material configured to suppress or eliminate such cross-talk.

In some examples, the optical redirectors 129 may also be configured to expand a beam width of the first portion of the return light 16 projected onto the first photodetector (and/or the second portion of the return light 16 projected onto the second photodetector). In this way, for example, detection area(s) at the respective photodetectors on which respective portion(s) of return light 16 are projected may be greater than the cross-sectional areas of their associated apertures.

In various example embodiments, the rotatable base 110, the mirror assembly 130, and the optical cavity 120 could be disposed so as to provide a field of view 17. In some embodiments, the field of view 17 could include an azimuthal angle range of 360 degrees about the first axis 102 and an elevation angle range of between 60 degrees and 120 degrees (e.g., at least 100 degrees, etc.) about the mirror rotation axis 131. In one embodiment, the elevation angle range could be configured to allow lidar system 100 to direct one or more emitted beams along the direction (and/or substantially parallel to) the first axis 102. It will be understood the other azimuthal angle ranges and elevation angle ranges are possible and contemplated.

In some embodiments, the field of view 17 could have two or more continuous angle ranges (e.g., a "split" field of view or a discontinuous field of view, etc.). In one embodiment, the two or more continuous angle ranges may extend away from a same side of the first axis 102. Alternatively, in another embodiment, the two or more continuous angle ranges may extend away from opposite sides of the first axis 102. For example, a first side of the first axis 102 may be associated with elevation angles between 0 degrees and 180 degrees, and a second side of the first axis may be associated with elevation angles between 180 degrees and 360 degrees.

In some embodiments, the lidar system 100 includes a rotatable housing 160 having one or more optical windows 162. The optical windows 162 could include one or more flat windows. Additionally or alternatively, the optical windows 162 could include a curved window and/or a window with refractive optical power. As an example, the curved window could provide an extended field of view (compared to a flat optical window) in exchange for some loss or degradation in the quality of the optical beam. In such scenarios, the light pulses could be emitted toward, transmitted through, and received from, the environment 10 through the optical windows 162. Furthermore, although multiple optical windows are described in various embodiments herein, it will be understood that examples with a single optical window are possible and contemplated.

The optical windows 162 could be substantially transparent to light having wavelengths such as those of the emitted light pulses (e.g., infrared wavelengths, etc.). For example, the optical windows 162 could include optically transparent materials configured to transmit the emitted light pulses with a transmission efficiency greater than 80% in the infrared wavelength range. In one embodiment, the transmission efficiency of the optical windows 162 may be greater than or equal to 98%. In another embodiment, the transmission efficiency of the optical windows 162 may vary depending on the angles-of-incidence of the transmitted and/or received light incident on the optical windows 162. For instance, the transmission efficiency may be lower when light is incident on the optical window from relatively higher angles-of-incidence than when the light is incident from relatively lower angles-of-incidence.

In some examples, the optical windows 162 could be formed from a polymeric material (e.g., polycarbonate, acrylic, etc.), glass, quartz, or sapphire. It will be understood that other optical materials that are substantially transparent to infrared light are possible and contemplated.

In some embodiments, other portions of the rotatable housing 160 could be coated with, or be formed from, an optically absorptive material such as black tape, absorptive paint, carbon black, black anodization, micro-arc oxidation treated surface or material, and/or another type of optically absorptive, anti-reflective surface or material.

The various elements of lidar system 100 could be disposed in different arrangements. For example, in an example embodiment, at least one of the light-receiving axis 19 or the light-emission axis 18 does not intersect the mirror rotation axis 131.

The lidar system 100 includes a controller 150. In some embodiments, the controller 150 includes one or more central processing units (CPUs), one or more microcontrollers, one or more graphical processing units (GPUs), one or more tensor processing units (TPUs), one or more application-specific integrated circuits (ASICs), and/or one or more field-programmable gate arrays (FPGAs). Additionally or alternatively, the controller 150 may include one or more processors 152 and a memory 154. The one or more processors 152 may include a general-purpose processor or a special-purpose processor (e.g., digital signal processors, graphics processor units, etc.). The one or more processors 152 may be configured to execute computer-readable program instructions that are stored in the memory 154. As such, the one or more processors 152 may execute the program instructions to provide at least some of the functionality and operations described herein. Other types of circuits and computing devices are possible and contemplated.

The memory 154 may include, or take the form of, one or more computer-readable storage media that may be read or accessed by the one or more processors 152. The one or more computer-readable storage media can include volatile and/or non-volatile storage components, such as read-only memory (ROM), programmable read-only memory (PROM), erasable programmable read-only memory (EPROM), electrically erasable programmable read-only memory (EEPROM), static random access memory (SRAM), dynamic random access memory (DRAM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc., which may be integrated in whole or in part with at least one of the one or more processors 152. In some embodiments, the memory 154 may be implemented using a single physical device (e.g., one optical, magnetic, organic or other memory or disc storage unit, etc.), while in other embodiments, the memory 154 can be implemented using two or more physical devices.

As noted, the memory 154 may include computer-readable program instructions that relate to operations of lidar system 100. As such, the memory 154 may include program instructions to perform or facilitate some or all of the operations or functionalities described herein.

For example, the operations could include causing the light-emitter device 126 to emit the light pulses. In such scenarios, the controller 150 could cause a pulser circuit associated with light-emitter device 126 to provide one or more current/voltage pulses to the light-emitter device 126, which may cause the light-emitter device 126 to provide the light pulses.

The operations could also include receiving at least a first portion of reflected light pulses (e.g., return light 16, etc.) from the field of view 17 as a detected light signal. For example, at least some of the light pulses emitted from the light-emitter device 126 via the optical windows 162 (e.g., transmit light 14, etc.) could interact with objects 12 in the environment 10 in the field of view 17 so as to provide reflected light pulses or return light 16. At least a portion of the reflected light pulses could be received by at least one photodetector of the plurality of photodetectors 122. In turn, the given photodetector could provide a detected light signal, which could include a current-varying signal or a voltage-varying signal.

Furthermore, the operations could include determining, based on the detected light signal, a point cloud indicative of objects 12 within the field of view 17. In an example embodiment, determining the point cloud could be performed by controller 150. For example, the controller 150 could determine and accumulate a plurality of spatial points based on a respective time of flight for each light pulse emitted and received. Determining the point cloud could be further based on an elevation angle of the mirror assembly 130 and an azimuthal angle of the rotatable base 110.

It will be understood that some or all of the operations described herein could be carried out by computing devices located remotely from the controller 150 and/or other elements of lidar system 100.

In various embodiments, the lidar system 100 could include at least one baffle. For example, the lidar system 100 could include at least one rotatable baffle 170 and/or at least one static baffle 172. In such scenarios, the at least one rotatable baffle 170 and/or at least one static baffle 172 could be configured to reduce stray light within the optical cavity 120 (e.g., light traveling internally from the light-emitter device 126 to the plurality of photodetectors 122 without first interacting with the environment 10 around the lidar system 100, etc.). In an example embodiment, the static baffle 172 could include an optically-opaque material disposed between the light-receiving axis 19 and the light-emission axis 18. In some embodiments, the rotatable baffle 170 could be coupled to the mirror body 133 and could also include an optically-opaque material configured to reduce or eliminate stray light between the transmitter portions and the receiver portions of the lidar system 100. In other words, a first portion of the mirror body 133 and a second portion of the mirror body 133 could be separated by the rotatable baffle 170. In such scenarios, the rotatable baffle 170 could be shaped like a flat disk, however other shapes are contemplated and possible. The rotatable baffle 170 could be centered about, and perpendicular to, the mirror rotation axis 131.

In some embodiments, the static baffle 172 could extend toward the mirror rotation axis 131 and the rotatable baffle(s) 170 could extend away from the mirror rotation axis 131 so that the static baffle 172 and rotatable baffle(s) 170 could overlap so as to reduce stray light between the transmitter portions and the receiver portions of the lidar system 100. The amount of overlap could be adjusted and/or increased so as to minimize stray light.

In some embodiments, the lidar system 100 could include an optical feedback system. As a part of the optical feedback system, the transmitter 127 could be configured to transmit, during the period of rotation of the mirror body 133, a plurality of light pulses toward the reflective surfaces 132 of the mirror assembly 130. In such a scenario, the mirror assembly 130 could be configured to (i) reflect at least a first light pulse of the plurality light pulses into an environment 10 of the lidar system 100 and (ii) reflect at least a second light pulse of the plurality of light pulses into an internal optical path 168. In some embodiments, the internal optical path 168 may include a baffle opening 174 in the rotatable baffle 170, the static baffle 172, and/or in a gap between the rotatable baffle 170 and the static baffle 172.

In such scenarios, the plurality of photodetectors 122 of the receiver 121 could be configured to (i) detect a reflected light pulse including a reflection of the first light pulse caused by an object 12 in the environment 10 and (ii) detect the second light pulse received via the internal optical path 168. In various embodiments, the internal optical path 168 could be defined at least in part by one or more internal reflectors 180 that reflect the second light pulse toward the reflective surfaces 132 of the mirror assembly 130 such that the reflective surfaces 132 reflect the second light pulse toward the receiver 121.

Furthermore, in such scenarios, the controller 150 could be configured to determine a distance to the object 12 in the environment 10 based on a time when the first light pulse is transmitted by the transmitter 127, a time when the first light pulse is detected by the photodetector 122, a time when the second light pulse is emitted/transmitted by the transmitter 127, and a time when the second light pulse is detected by the photodetector 122. In such scenarios, a first light pulse (and its corresponding reflected light pulse) could provide information indicative of a distance to an object 12 and a second light pulse (and its corresponding reflected light pulse) could provide information indicative of a feedback distance or zero-length reference.

An occlusion detection system of lidar system 100 could include a primary reflective surface 163. In some embodiments, the primary reflective surface 163 could include a rectangular mirror with an aspect ratio of at least 8:1. However, it will be understood that other shapes of the primary reflective surface 163 are contemplated and possible within the context of the present disclosure. In example embodiments, the primary reflective surface 163 could include a long axis that is disposed substantially parallel to the mirror rotation axis 131.

In such a scenario, the reflective surfaces 132 of the mirror body 133 could represent a plurality of secondary reflective surfaces. Lidar system 100 could also include a camera 166. The camera 166 is configured to capture at least one image of one or more optical elements (e.g., the optical windows 162, etc.) by way of the primary reflective surface 163 and at least one secondary reflective surface of the mirror body 133.

In a lidar context, an occlusion or a scratch in an optical component of the lidar may adversely affect ranging and localization of objects in an environment. In such scenarios, fouled or degraded optical components may render the lidar system ineffective and/or cause the lidar system to provide incorrect or inaccurate information about the environment. Cameras may be used in lidar applications to detect if any dirt, water, or other debris (e.g. dust, soil, mud, insects or other types of organic or inorganic matter, etc.) is on the lidar dome, or if the lidar dome is damaged (e.g. cracked, fractured, etc.). In such scenarios, the controller 150 may be configured to carry out further operations relating to occlusion detection. Such operations could include causing the camera 166 to capture a plurality of images of the optical element by way of the primary reflective surface 163 and at least one secondary reflective surface of the mirror body 133. Each image of the plurality of images is captured at a corresponding mirror angle of the at least one secondary reflective surface.

The lidar system 100 additionally includes an illuminator 161. In some embodiments, the illuminator 161 could include an infrared light-emitting diode (LED). In such scenarios, the operations of the controller 150 could additionally include: while causing the camera 166 to capture the plurality of images, causing the illuminator 161 to emit light to illuminate the optical element by way of the primary reflective surface 163 and at least one secondary reflective surface of the mirror body 133.

The operations may additionally include determining an aggregate image of the optical element based on the plurality of images and the corresponding mirror angles of the at least one secondary reflective surface.

Additionally or alternatively, the operations could include determining, based on the aggregate image, that at least one occlusion object is present on the optical element. In some embodiments, the occlusion object could include a scratch, a crack, a smudge, a deformation, an occlusion, debris, an air bubble, an impurity, a degradation, a discoloration, an imperfect transparency, a warp, or condensation. It will be understood that other types of optical imperfections are possible and contemplated.

In some embodiments, the camera includes a fixed focal length lens configured to focus on the optical element by way of the primary reflective surface and the at least one secondary reflective surface. As an example, the camera could include a video capture device.

Figure 2A:
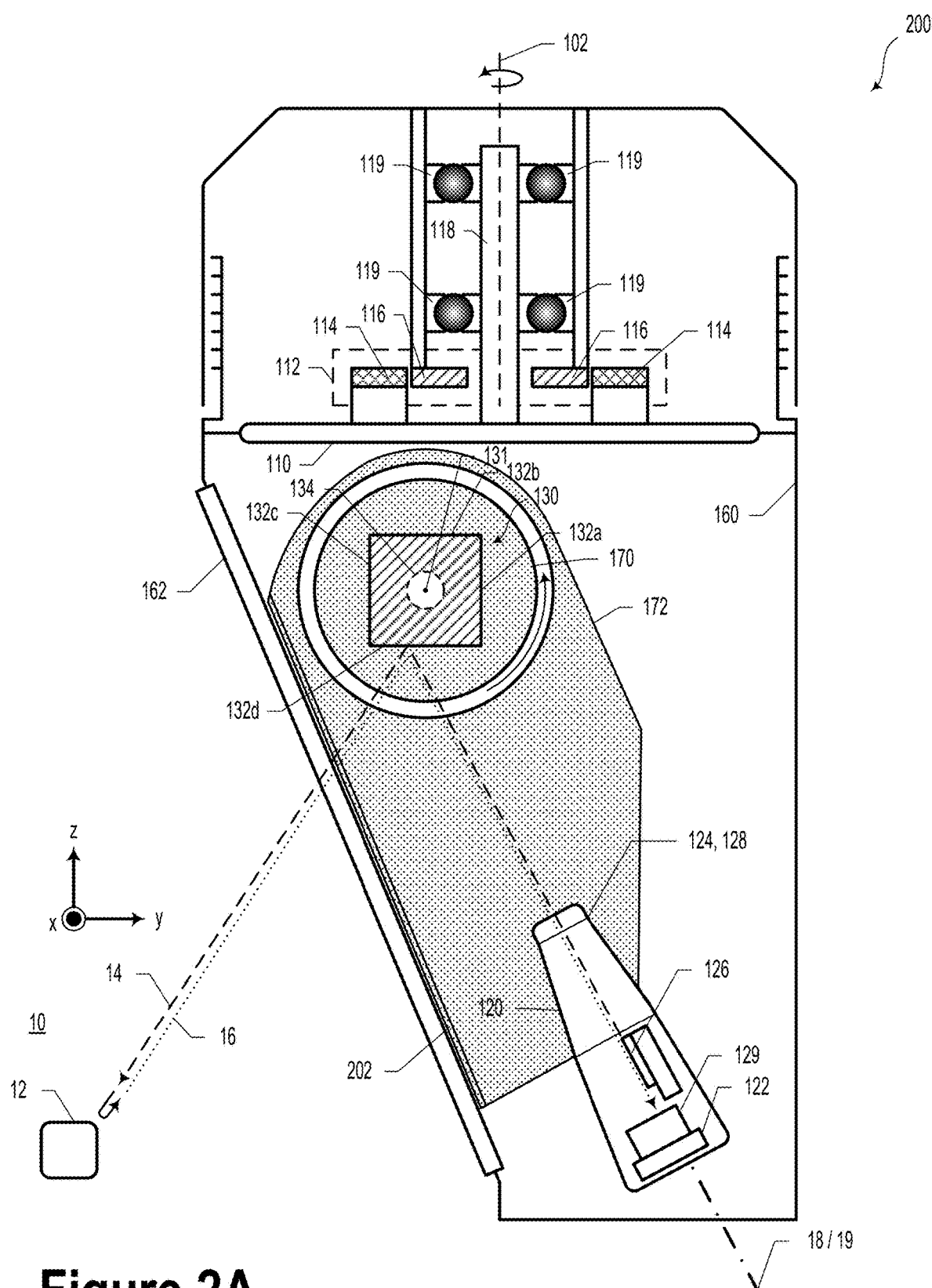
FIG. 2A illustrates a lidar system, according to an example embodiment.

FIG. 2A illustrates a lidar system 200, according to an example embodiment. Lidar system 200 could be similar or identical to lidar system 100, which is illustrated and described in relation to FIG. 1. For example, lidar system 200 could include a rotatable base 110. The rotatable base 110 could be configured to rotate about first axis 102. Furthermore, lidar system 200 could include an optical cavity 120, which could include light-emitter device 126, light-emitter lens 128, photodetector 122, and photodetector lens 124. Furthermore, in some embodiments, lidar system 200 could include a mirror assembly 130. The mirror assembly 130 could include a plurality of reflective surfaces 132a, 132b, and 132c and a shaft 134. The mirror assembly 130 could be configured to rotate about a mirror rotation axis 131.

In some embodiments, the light-emitter device 126 and the light-emitter lens 128 could form a light-emission axis 18. As illustrated in FIG. 2A, light pulses emitted by the light-emitter device 126 could interact with reflective surface 132d so as to be reflected toward at least one of the optical windows 162 and transmitted toward an object 12 in the environment 10.

In some embodiments, the photodetector 122 and the photodetector lens 124 could form a light-receiving axis 19. Light pulses emitted by the light-emitter device 126 could be reflected or otherwise interact with the environment 10 and could be received as return light 16 by way of the reflective surfaces 132 (e.g., reflective surface 132d, etc.) and observed at the plurality of photodetectors 122 by way of one or more optical redirectors 129. While light pulses may mainly interact with objects 12 in the environment 10, it will be understood that the light pulses could also interact with the atmosphere, dust, etc.

Figure 2B:
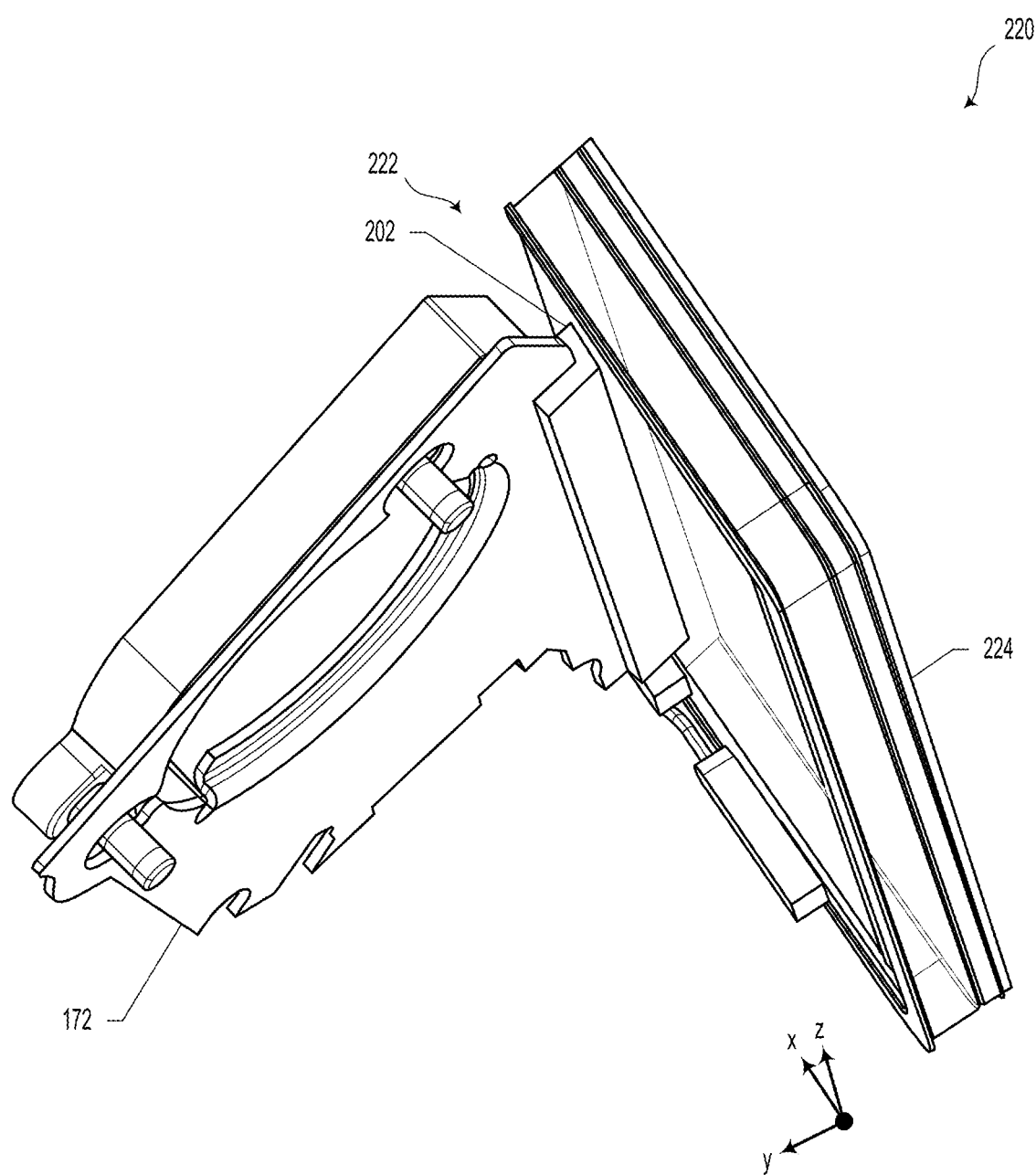
FIG. 2B illustrates a portion of the lidar system of FIG. 2A, according to an example embodiment.

FIG. 2B illustrates a portion 220 of the lidar system 200 of FIG. 2A, according to an example embodiment. As illustrated in FIGS. 2A and 2B, the static baffle 172 could include a blade strip 202 that may be configured to optically isolate a receiver portion 204a of the interior space 204 from a transmitter portion 204b of the interior space 204. In various examples, the blade strip 202 could be configured to approach (e.g., within 500 microns to 2000 microns, etc.) or come into direct contact with at least one of the plurality of optical windows 162 and/or the mechanical support member 246 separating a first optical window 222 and a second optical window 224 as illustrated in FIGS. 2D and 2E.

In some examples, the blade strip 202 could include an elastomeric material (e.g., isoprene rubber, butyl rubber, nitrile rubber, silicone rubber, ethylene-vinyl acetate (EVA), or another polymer having viscoelasticity, etc.).

Figure 2C:
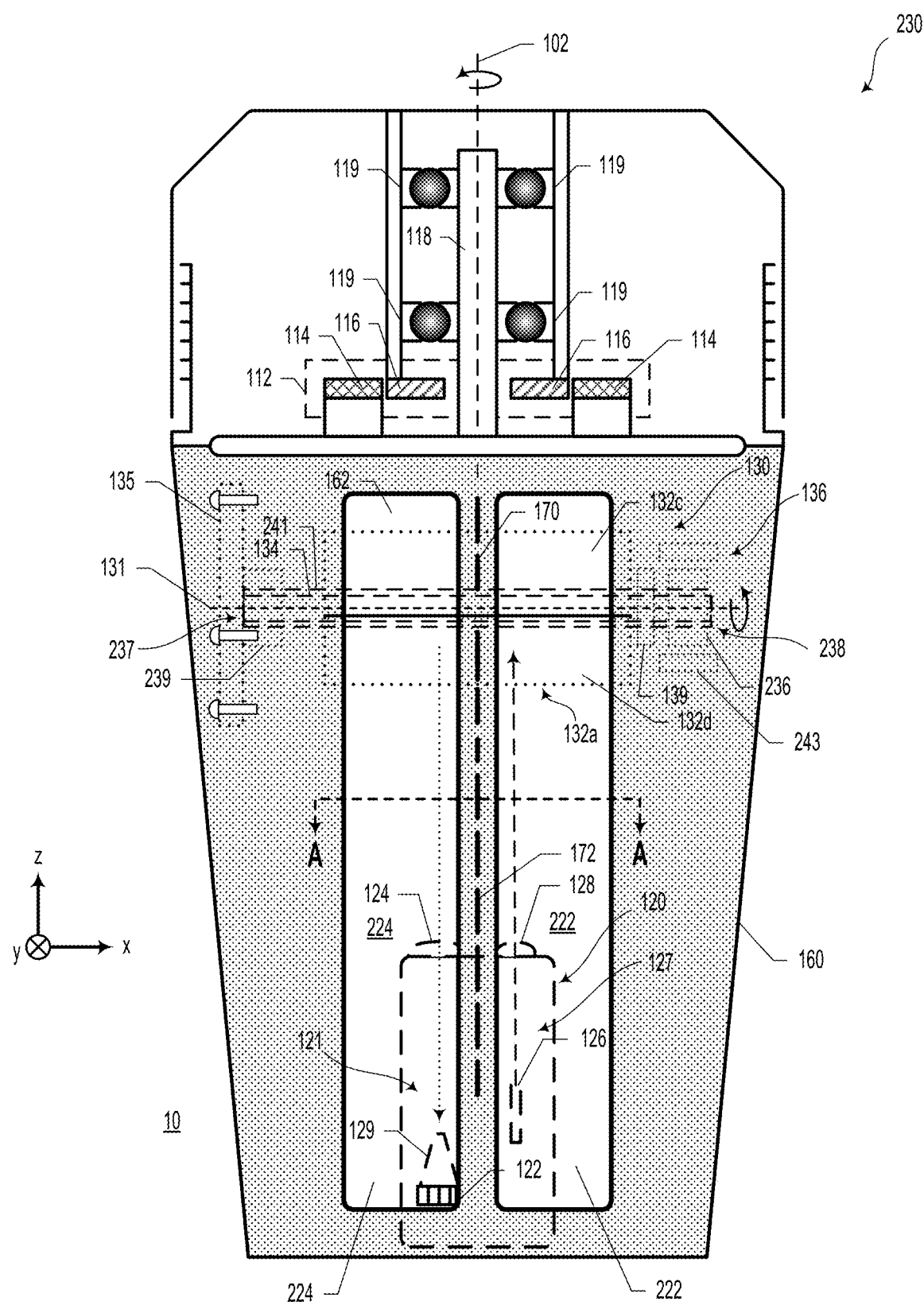
FIG. 2C illustrates a lidar system, according to an example embodiment.
Figure 2D:
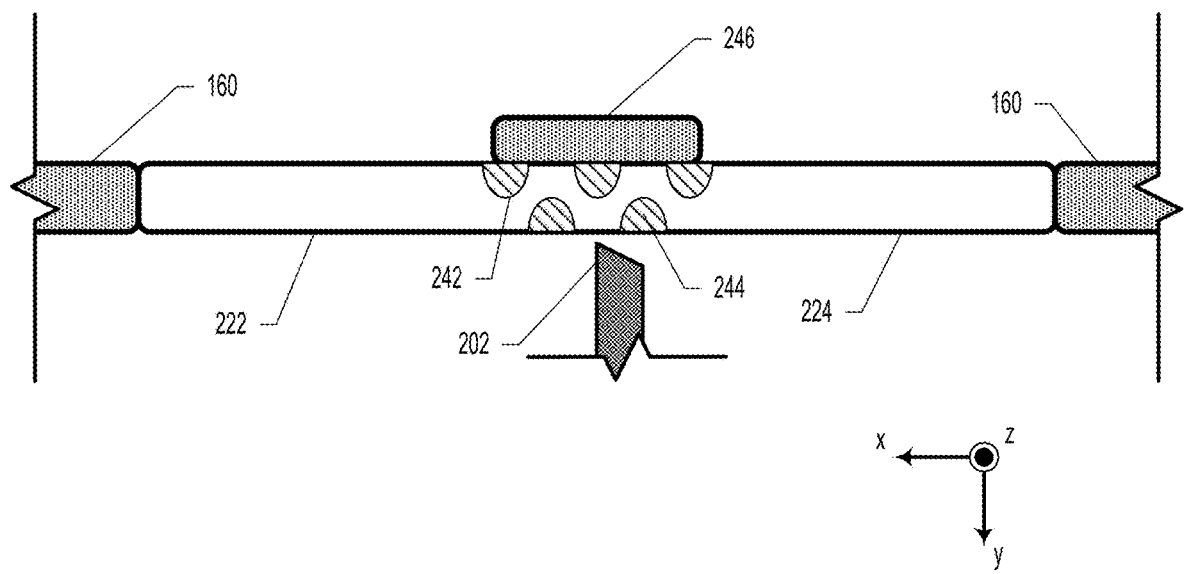
FIG. 2D illustrates an alternate view of the lidar system of FIG. 2C, according to an example embodiment.
Figure 2E:
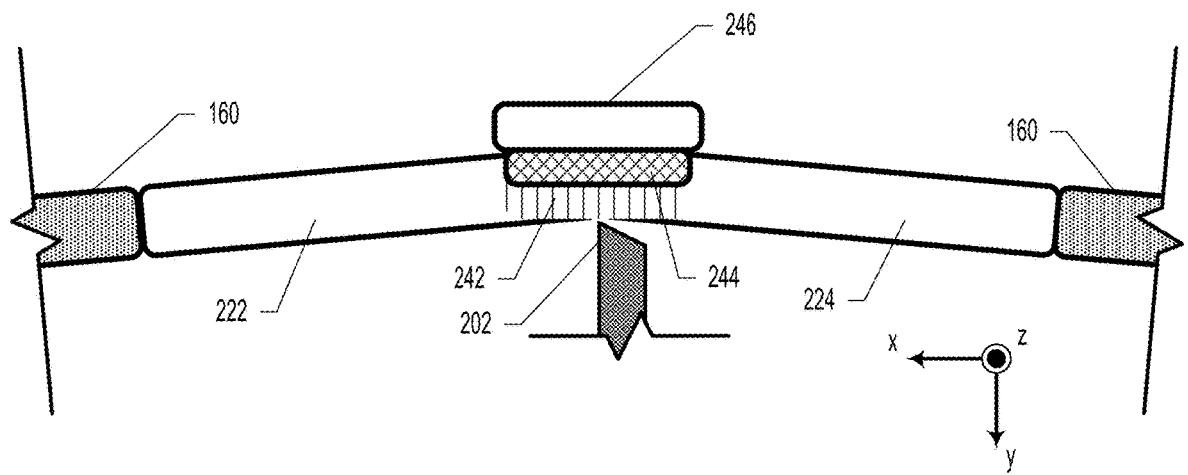
FIG. 2E illustrates an alternate view of the lidar system of FIG. 2C, according to an example embodiment.
Figure 2F:
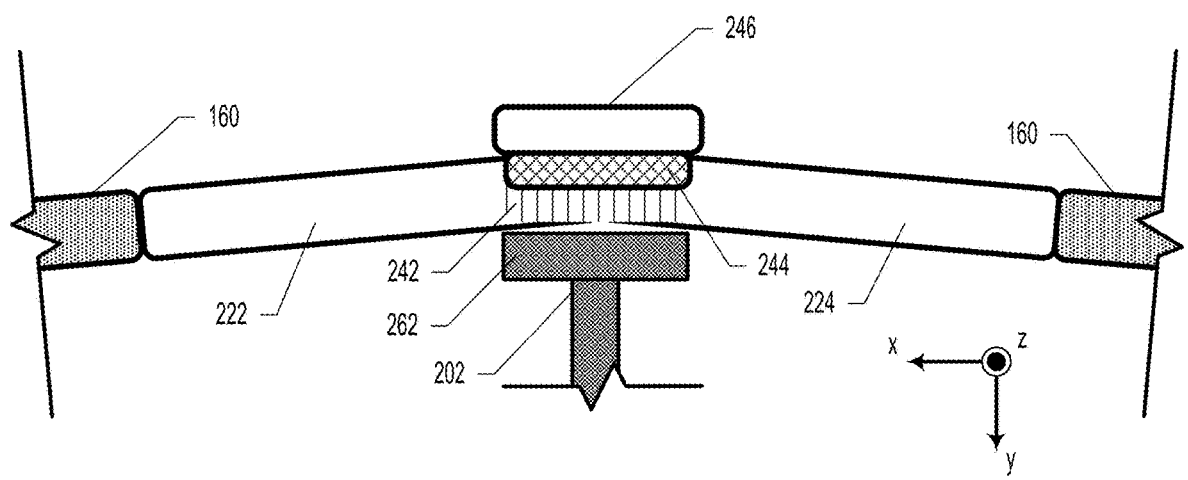
FIG. 2F illustrates an alternate view of the lidar system of FIG. 2C, according to an example embodiment.
Figure 2G:
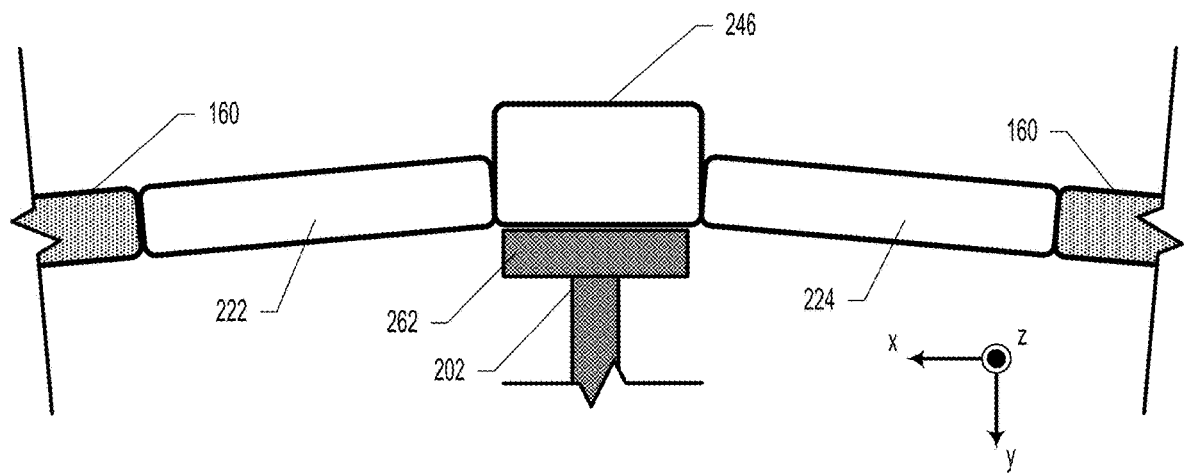
FIG. 2G illustrates an alternate view of the lidar system of FIG. 2C, according to an example embodiment.
Figure 2H:
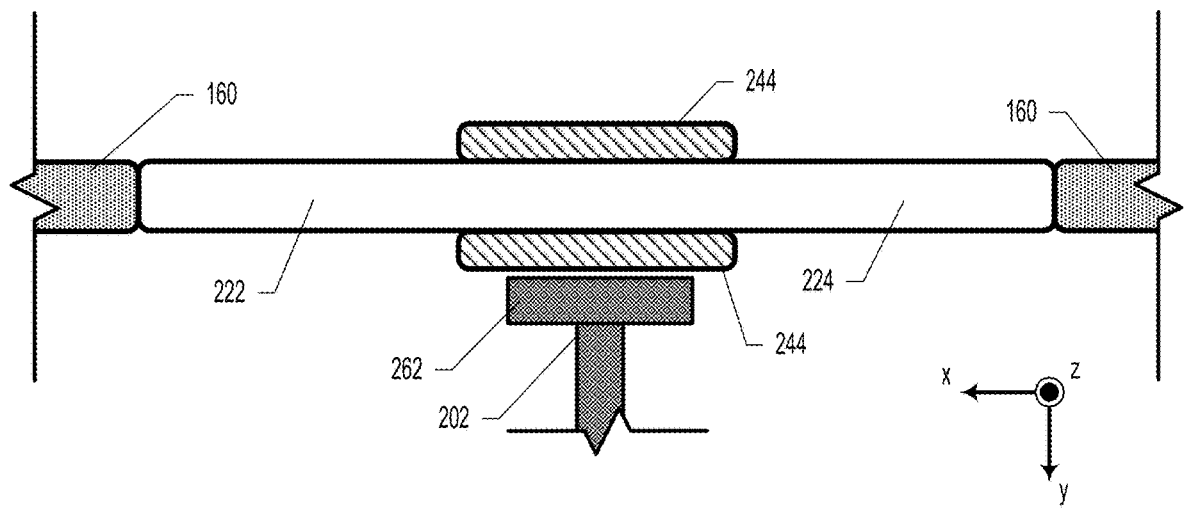
FIG. 2H illustrates an alternate view of the lidar system of FIG. 2C, according to an example embodiment.

FIG. 2C illustrates a lidar system 230, according to an example embodiment. As illustrated in FIG. 2C, the shaft 134 could have a first end 237 and a second end 238 opposite the first end 237. In such scenarios, the mirror actuator 136 could be coupled to the second end 238 of the shaft 134. Additionally or alternatively, the mirror assembly 130 could include one or more bearings 239, each bearing having an inner race and an outer race. As an example, bearing 239 could include a cylindrical bearing. However, it will be understood that other types of rotational bearings are possible and contemplated. In such scenarios, the inner race of at least one bearing 239 could be coupled to the shaft 134 proximate the first end 237. Additionally or alternatively, the coupling bracket 135 could be coupled to the outer race of the bearing 239. In such scenarios, the coupling bracket 135 could be removably mounted to the housing 160.

In various embodiments, a plastic material 241 could be disposed on at least a portion of the shaft 134 between the first end 237 and the second end 238. As an example, the plastic material 241 could be coupled to the shaft 134 in the form of a coating or as a separate plastic part (e.g., mirror body 133, etc.). Additionally or alternatively, the plastic material 241 could include an inner portion disposed on the shaft 134, an outer portion on which the reflective material is disposed (e.g., to provide the reflective surfaces 132, etc.), a space between the inner portion and outer portion, and a plurality of couplings (e.g., flexible members 138, etc.) extending between the inner portion and the outer portion. In such a scenario, each coupling of the plurality of couplings may include a radial member and a cross-bar member, as described in relation to FIG. 3B. Namely, in some embodiments, the flexible members could be t-shaped. In some embodiments, the flexible members could each include two first ends 324a and 324b and a second end 326. In some examples, the two first ends 324a and 324b could couple to two different interior surfaces that correspond to (are located opposite) two different reflective surfaces 132 of the mirror body 133. In such scenarios, the cross-bar member could extend between a first side of the outer portion and a second side of the outer portion.

While embodiments described herein may include a shaft 134 formed from a first material (e.g., steel, etc.) and a plastic material 241 configured to support the reflective surfaces 132, it will be understood that other arrangements are possible. For example, the shaft 134 and the support members that support the reflective surfaces 132 could be formed from a single material and/or single piece of a single material. In such scenarios, the shaft 134 and support members could be formed from a single piece of steel or aluminum.

In some examples, the mirror actuator 136 could include: a) at least one magnet 236 (e.g., a rotor magnet, etc.) disposed on the plastic material 241 proximate to the second end 238 of the shaft 134; and b) a stator 233 configured to interact with the at least one magnet 236 to rotate the mirror assembly 130 about the rotational axis 131. As described herein, the shaft 134 could be formed from a metal. In such a scenario, the plurality of couplings could be configured to be flexible in a direction perpendicular to the rotational axis 131, such that the plurality of couplings accommodate for a thermal expansion difference between the metal and the plastic material 241.

In some embodiments, the encoder magnet 139 could be disposed on the plastic material 241 proximate the second end 238 of the shaft 134. In such scenarios, the encoder magnet 139 could be configured to provide information indicative of a rotational position of the mirror assembly 130 with respect to the transmitter 127 and the receiver 121.

FIGS. 2D, 2E, 2F, 2G, and 2H illustrate alternate views 240, 250, 260, 270, and 280 of the lidar system 230 of FIG. 2C, according to example embodiments.

Figure 3A:
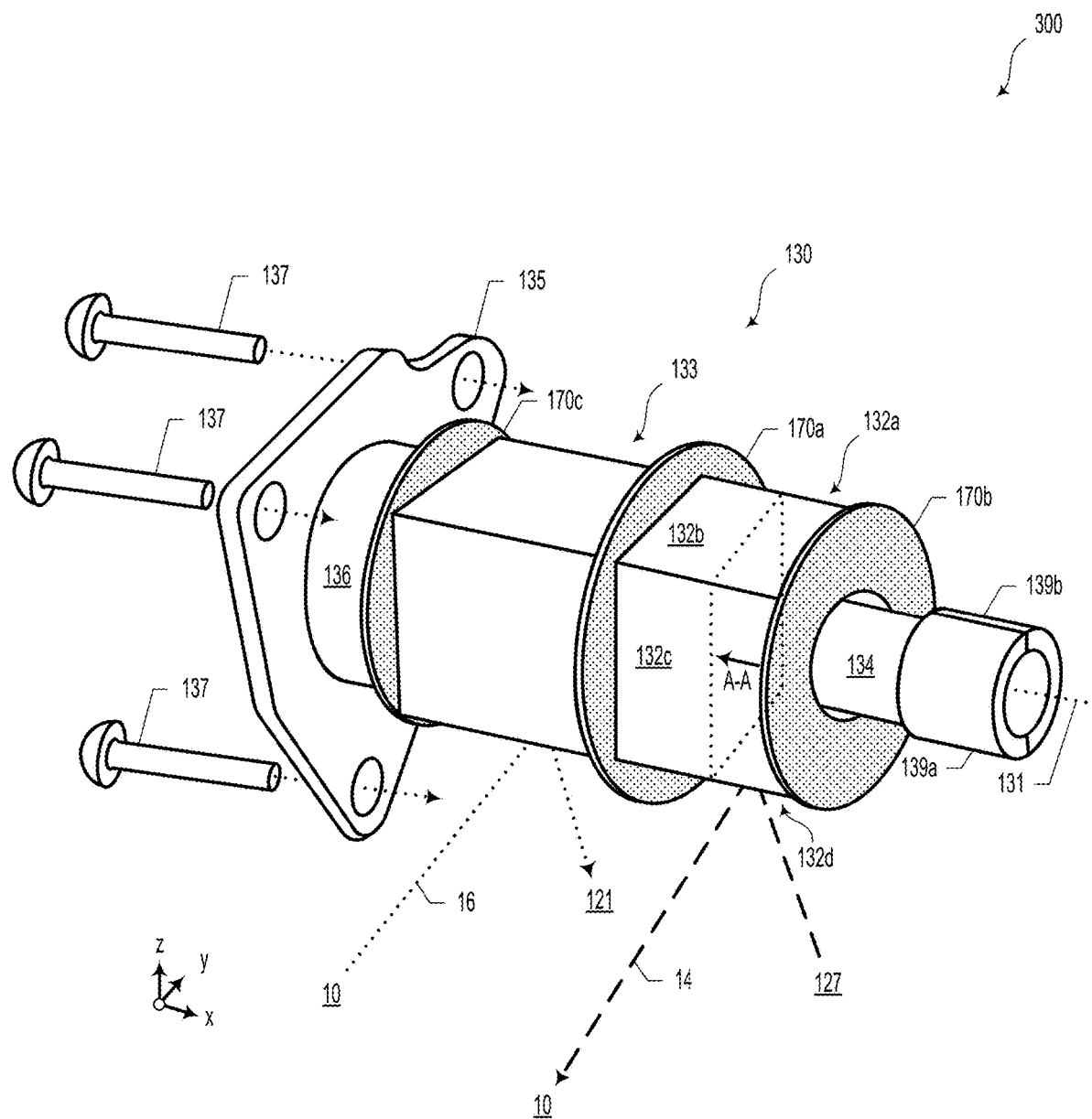
FIG. 3A illustrates a mirror assembly, according to an example embodiment.

In the various illustrated examples, lidar system 200 could include a housing (e.g., housing 160, etc.), which defines an interior space 204. In such scenarios, the housing could include a plurality of optical windows (e.g., optical windows 162, etc.). Lidar system 200 may also include a rotatable mirror assembly (e.g., mirror assembly 130, etc.) disposed within the interior space 204. In such examples, the rotatable mirror assembly includes a transmit mirror portion (e.g., transmit mirror portion 302 as illustrated in FIG. 3A, etc.) and a receive mirror portion (e.g., receive mirror portion 304 as illustrated in FIG. 3A, etc.).

In some examples, lidar system 200 includes a transmitter (e.g., transmitter 127, etc.) disposed within the interior space 204. In such scenarios, the transmitter is configured to emit emission light (e.g., transmit light 14, etc.) into an environment 10 of the lidar system 200 along a transmit path. As an example, the transmit path could include the transmit mirror portion and at least a first optical window 222 of the plurality of optical windows.

The lidar system 200 also includes a receiver (e.g., receiver 121, etc.) disposed within the interior space 204. The receiver is configured to detect return light (e.g., return light 16, etc.) that is received from the environment 10 along a receive path. As an example, the receive path could include at least a second optical window 224 of the plurality of optical windows and the receive mirror portion. The lidar system 200 also includes at least one optical baffle (e.g., static baffle 172 and rotatable baffle 170, etc.), which are configured to minimize stray light and optical cross-talk in the interior space 204.

In various examples, the optical windows could be formed from at least one of: borosilicate glass, plastic, or another optical material. In example embodiments, the plurality of optical windows could include a first optical window 222 and a second optical window 224. In such scenarios, the first optical window 222 and the second optical window 224 could be arranged as a split window (e.g., split window 248 as illustrated in FIG. 2D, etc.). In other words, the split window configuration could include the first optical window 222 and the second optical window 224 disposed or arranged adjacent to one another.

In some examples, the housing could include at least one mechanical support member (e.g., mechanical support member 246, etc.), which may separate the first optical window 222 and the second optical window 224 of the split window 248. In such scenarios, the mechanical support member may be physically thicker than the first optical window 222 or the second optical window 224. As an example, the mechanical support member 246 could be configured to provide physical protection for the split window 248.

In some examples, the first optical window 222 could be oriented along a first plane and the second optical window 224 could be oriented along a second plane. In other words, the respective optical windows could be arranged or disposed along different planes so that they are tilted or angled with respect to one another.

In some examples, the first optical window 222 and the second optical window 224 could be defined by one or more straight or offset cuts 242 in one or both surfaces of a common optical window substrate 249. In such scenarios, at least some of the straight or offset cuts are filled with an optically absorbing material 244. It will be understood that embodiments including straight or offset cuts 242, but not including absorbing material 244, are also possible and contemplated. Yet further, embodiments including absorbing material 244, but not including straight or offset cuts 242, are possible and contemplated. In other example embodiments, the at least one optical window could include cuts in a front surface and/or a back surface that do not actually split the window in two, but that may form a labyrinth path to prevent light from waveguiding within the optical window from the transmit path to the receive path or vice versa. In another example, the optical window could include a significantly narrowed portion between the transmit and receive paths so as to minimize stray light. Yet further, examples could include an optical window that includes dark (e.g., opaque, etc.) ink on one or both surfaces to absorb some fraction of the light trying to get between two regions of the window.

As described herein, the optical baffle system could include a static baffle 172 and a rotatable baffle 170 that is coupled to the rotatable mirror assembly (mirror assembly 130, etc.). The static baffle 172 and the rotatable baffle 170 could be arranged in various ways to mitigate stray light and/or optical cross-talk within the interior space 204. For example, the static baffle 172 and the rotating baffle 170 could be configured to provide a tortuous path for stray light in the interior space 204.

In some examples, the static baffle 172 and/or the rotating baffle 170 could include a rounded edge or a bolus edge so as to reduce an amount of stray light that can pass around the respective optical baffles.

In some examples, the optical baffles could include at least one transverse baffle 262. In such scenarios, the transverse baffle 262 could be oriented perpendicular to the static baffle 172. In other examples, the transverse baffle 262 could be oriented at another angle with respect to the static baffle 172 (e.g., 30 degrees, 45 degrees, etc.). The transverse baffle 262 could be configured to reduce an amount of stray light in the interior space by allowing less light around an end surface of the static baffle 172. In other examples, the transverse baffle 262 could be arranged as one or more "ribs" along the surface of the static baffle 172. Other arrangements of the transverse baffle(s) with respect to the static baffle 172 are possible and contemplated.

FIG. 3A illustrates a mirror assembly 300, according to an example embodiment. Mirror assembly 300 could be similar or identical to the mirror assembly 130 illustrated and described in relation to FIG. 1. For example, mirror assembly 300 could include a plurality of reflective surfaces 132a, 132b, 132c, and 132d. The mirror assembly 300 could additionally include a shaft 134, which could be configured to rotate about the mirror rotation axis 131.

In some embodiments, the transmitter 127 could emit light pulses toward the mirror assembly 300 along a light-emission axis 18. A reflective surface 132d of the mirror assembly 300 could reflect such light pulses such that they are transmitted toward an environment 10.

In such examples, light from the environment 10 (e.g., return light 16) could be reflected by the reflective surface 132d of the mirror assembly 300. In some embodiments, the received light could be directed along light-receiving axis 19 toward the receiver 121.

Figure 3B:
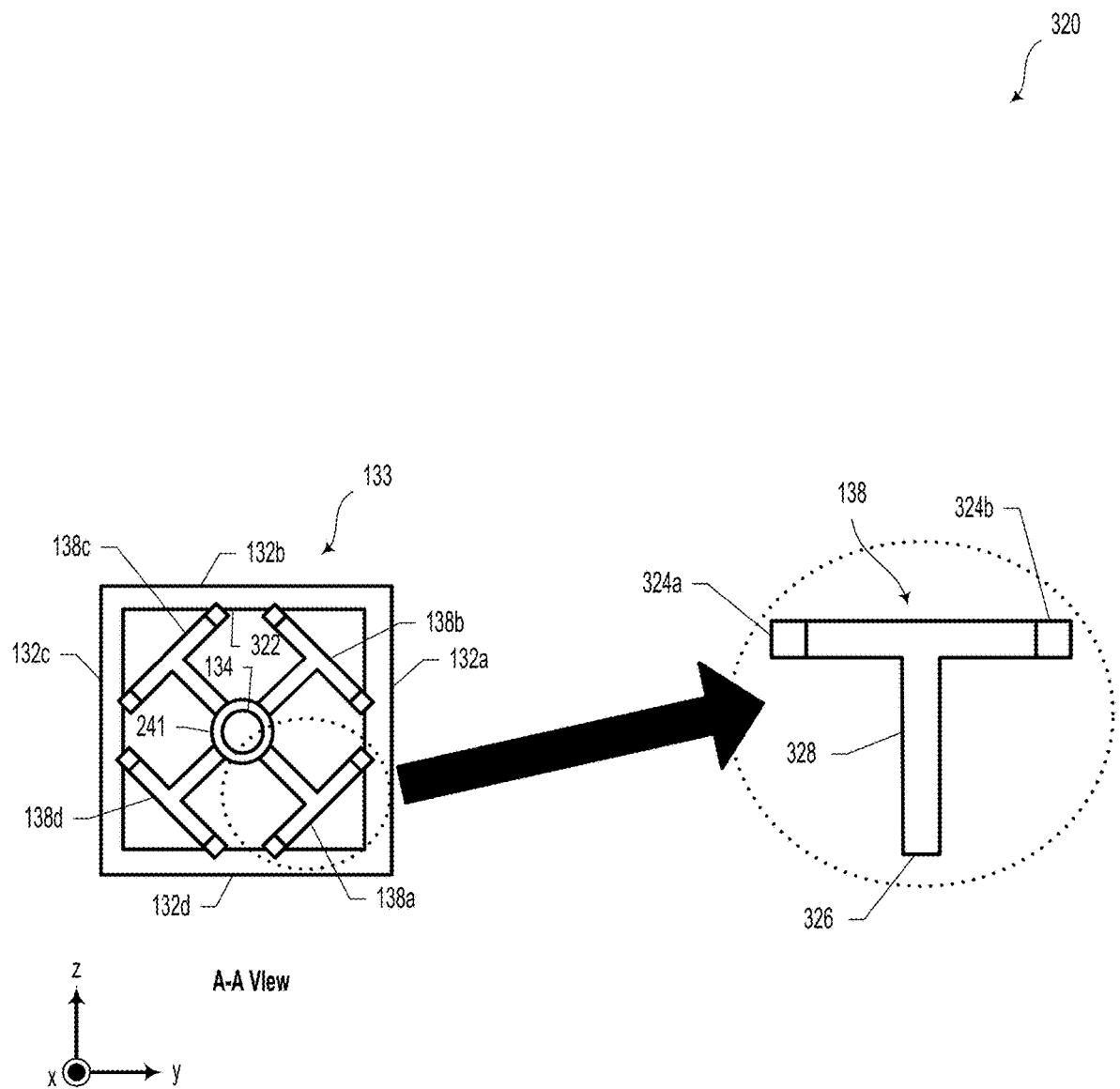
FIG. 3B illustrates a portion of the mirror assembly of FIG. 3A, according to an example embodiment.

FIG. 3B illustrates a portion 320 of the mirror assembly 300 of FIG. 3A, according to an example embodiment. The shaft 134 and the respective reflective surfaces 132a, 132b, 132c, and 132d could be coupled by way of one or more flexible members 138 (e.g., flexible members 138a, 138b, 138c, 138d, etc.). In some embodiments, flexible members 138a, 138b, 138c, and 138d could provide a flexible (e.g., flexural, etc.) structural support between the shaft 134 and an interior surface 322 of the mirror body 133. As described herein, the shaft 134 could be surrounded and/or coated, at least in part, by plastic material 241.

In example embodiments, the flexible members 138 could be t-shaped. Additionally or alternatively, the flexible members 138 could have an elongated t-shape. That is, the t-shape could be extended lengthwise along the x-axis. Other shapes are possible and contemplated.

In some embodiments, the flexible members 138 could each include two first ends 324a and 324b and a second end 326. In such a scenario, the two first ends 324a and 324b and the second end 326 could be coupled by way of a t-shaped member 328. As illustrated, the two first ends 324a and 324b could couple to two different interior surfaces that correspond to (are located opposite) two different reflective surfaces 132 of the mirror body 133.

In some embodiments, the two first ends 324a and 324b could be formed from a first material and the second end 326 could be formed from a second, different, material. As an example, various portions of the flexible members 138 could be formed from, without limitation, plastic (e.g., polypropylene, polyethylene, polycarbonate, silicone, etc.), rubber (e.g., latex, etc.), metal (e.g., aluminum, steel, titanium, etc.), and/or ceramic. It will be understood that other materials and material combinations are possible and contemplated within the scope of the present disclosure.

In example embodiments, the materials and/or geometry for one or more elements of the flexible members 138 could be selected so as to reduce or minimize the effect of differences in the coefficient of thermal expansion between, for example, the shaft 134 and the reflective surfaces 132. For example, the two first ends 324a and 324b could be selected to be silicone so as to provide a compliant, flexible material that is relatively insensitive to thermal variations. Additionally or alternatively, in some embodiments, the t-shaped member 328 could be formed from a flexible material so as to reduce or minimize the forces upon, or relative displacement of, the reflective surfaces 132 from the shaft 134. Such forces and/or displacement could be due, at least in part, to differences in the coefficient of thermal expansion. Accordingly, by utilizing the disclosed flexible members 138, mirror assembly 130 and/or other portions of lidar system 100 could be less affected by fluctuation in temperature, temperature-dependent material bowing or displacement, and/or long term temperature-cycling effects (e.g., thermal destressing, etc.).

FIGS. 3C-3K illustrate respective cross-sectional views of mirror assemblies and baffle arrangements, according to example embodiments. The various embodiments illustrated in FIGS. 3C-3K could be utilized to reduce or eliminate stray light that may impinge at a grazing angle (e.g., less than 10 degrees, etc.) relative to the primary baffle surface. Such stray light sources may include, for example, light that reflects from the optical window 162, other elements of lidar system 100, objects 12 in the environment 10, and/or light that may be emitted by other light sources. Furthermore, while FIGS. 3C-3K illustrate the presence of a static baffle 172 and a rotatable baffle 170a, it will be understood that other examples need not include the rotatable baffle 170a. That is, some embodiments could include a variously-shaped and/or -sized static baffle 172 without a corresponding rotatable baffle portion.

Figure 3C:
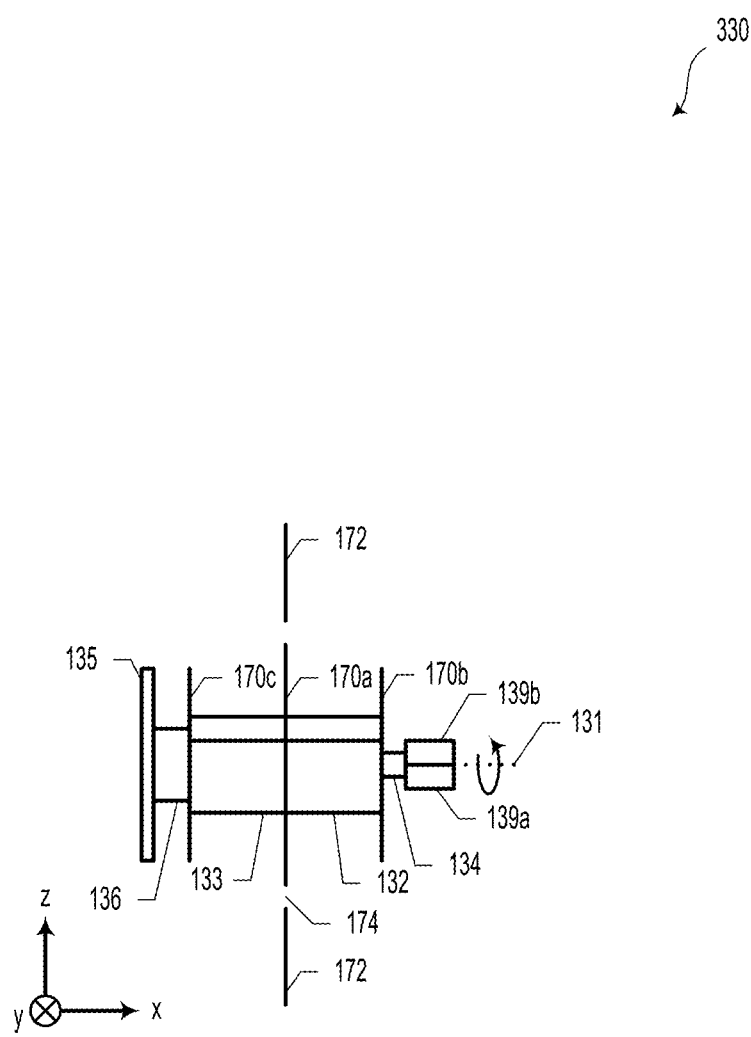
FIG. 3C illustrates a mirror assembly and baffle arrangement, according to an example embodiment.

FIG. 3C illustrates a cross-sectional view of a baffle arrangement 330 that includes a static baffle 172 and a rotatable baffle 170a that are disposed so as to provide a baffle opening 174. In some embodiments, the baffle opening 174 could be sized so as to provide a desired gap between the transmitter and receiver portions of the optical cavity 120. In some embodiments, the baffle opening 174 may provide needed mechanical freedom so that the rotatable baffle 170a may rotate freely without colliding with the static baffle 172.

Figure 3D:
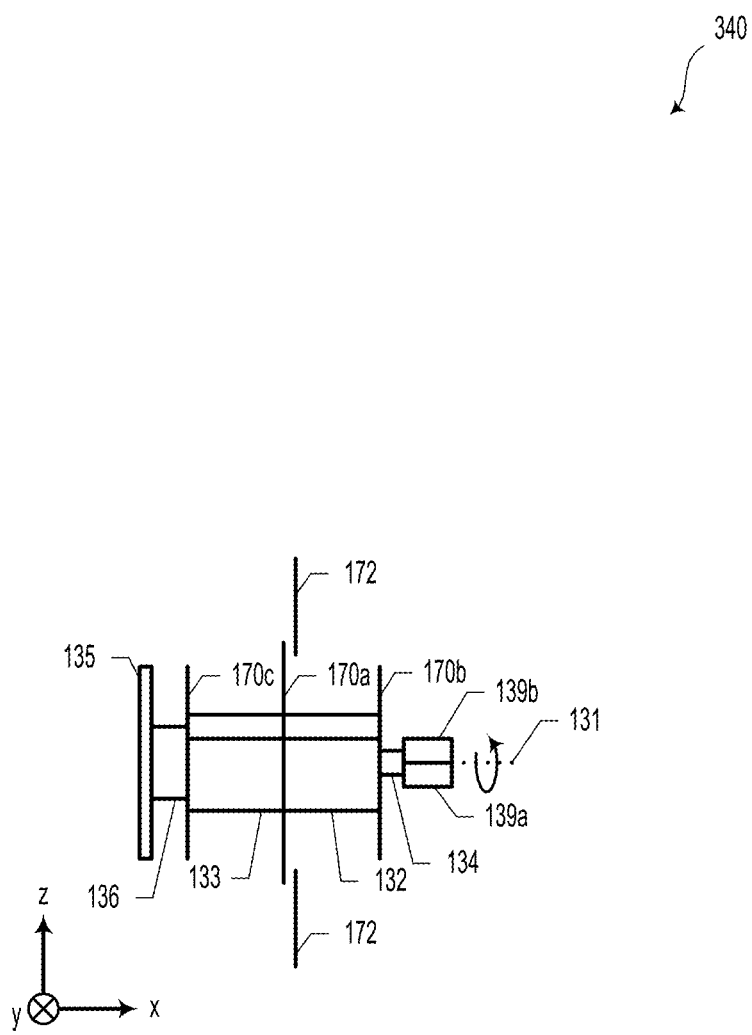
FIG. 3D illustrates a mirror assembly and baffle arrangement, according to an example embodiment.

FIG. 3D illustrates a cross-sectional view of a baffle arrangement 340 that includes a static baffle 172 and a rotatable baffle 170a that are overlapped along an axis parallel to the rotational axis 131 so as to avoid a direct baffle opening. That is, the overlapped baffle arrangement 340 may provide improved optical isolation between the transmitter and receiver portions of the optical cavity 120. In other words, the overlapped baffle arrangement 340 could reduce light leakage and/or internal reflections within the optical cavity 120.

Figure 3E:
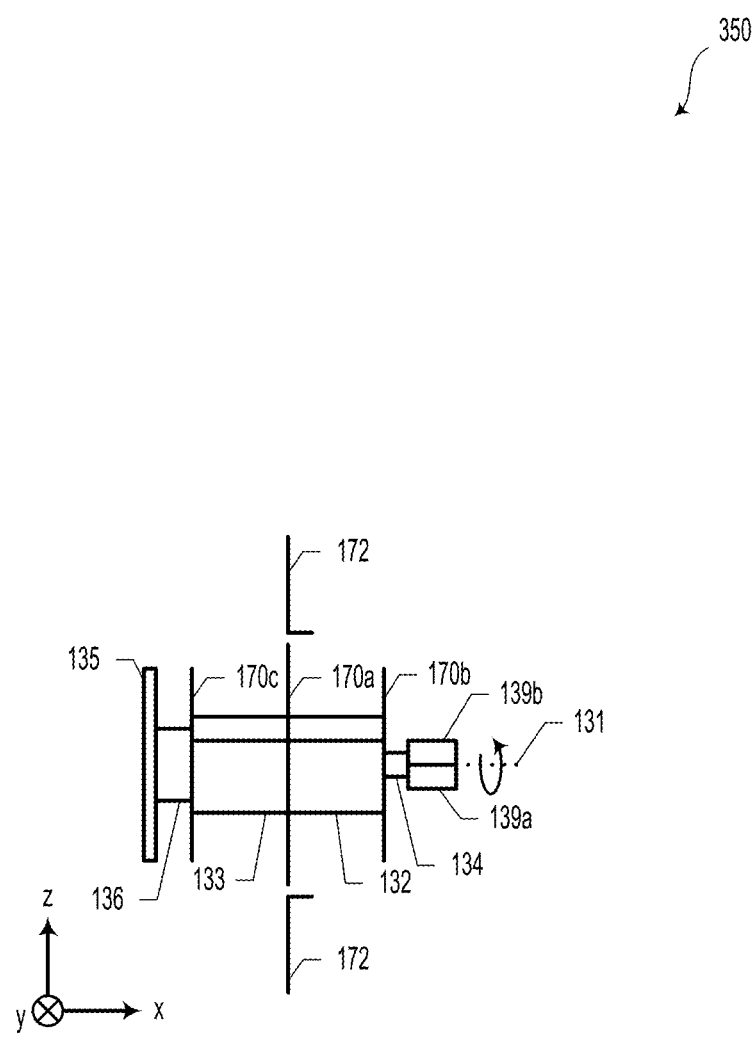
FIG. 3E illustrates a mirror assembly and baffle arrangement, according to an example embodiment.

FIG. 3E illustrates a cross-sectional view of a baffle arrangement 350 that includes an L-shaped static baffle 172 and a rotatable baffle 170a. In such an embodiment, the L-shaped static baffle 172 could provide a "lip" that may be configured to improve optical isolation between the transmitter and receiver portions of the optical cavity 120. For example, the L-shaped static baffle 172 could be shaped and/or sized so as to block stray light within the optical cavity 120.

Figure 3F:
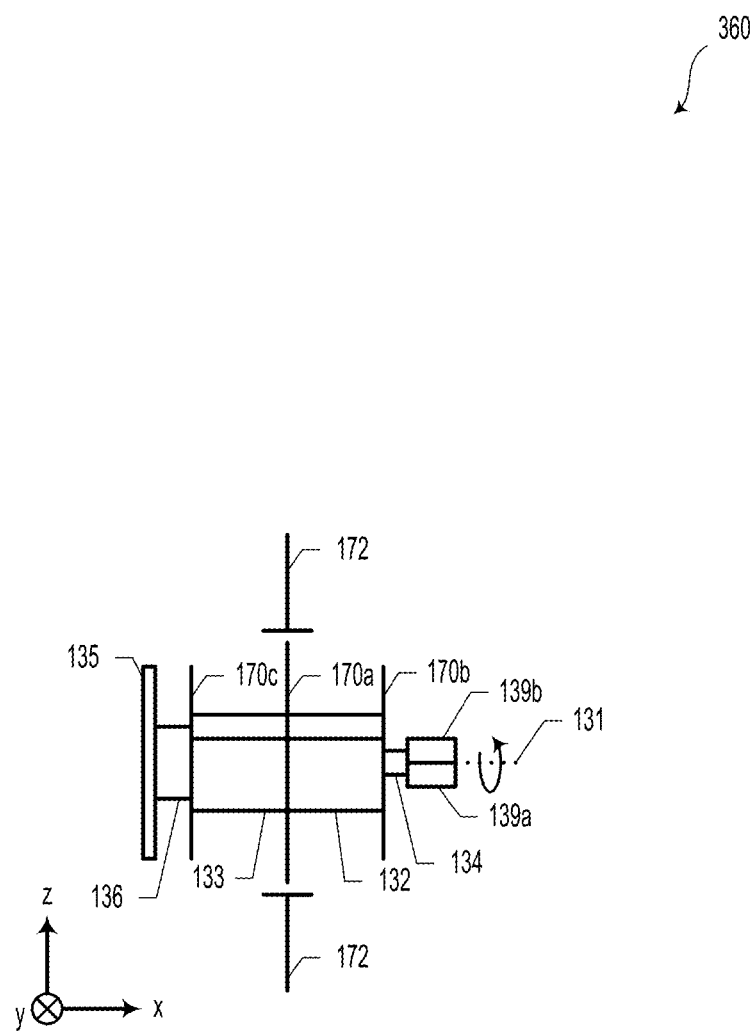
FIG. 3F illustrates a mirror assembly and baffle arrangement, according to an example embodiment.

FIG. 3F illustrates a cross-sectional view of a baffle arrangement 360 that includes a static baffle 172 with a T-shaped cross-section and a rotatable baffle 170a. In such an embodiment, the T-shaped static baffle 172 could provide a dual-edged "lip" that may improve optical isolation between the transmitter and receiver portions of the optical cavity 120. For example, the T-shaped static baffle 172 could be shaped and/or sized so as to block stray light within the optical cavity 120. In other words, the L-shaped and T-shaped static baffles 172 could reduce the internal reflections and/or light leakage within the optical cavity 120.

Figure 3G:
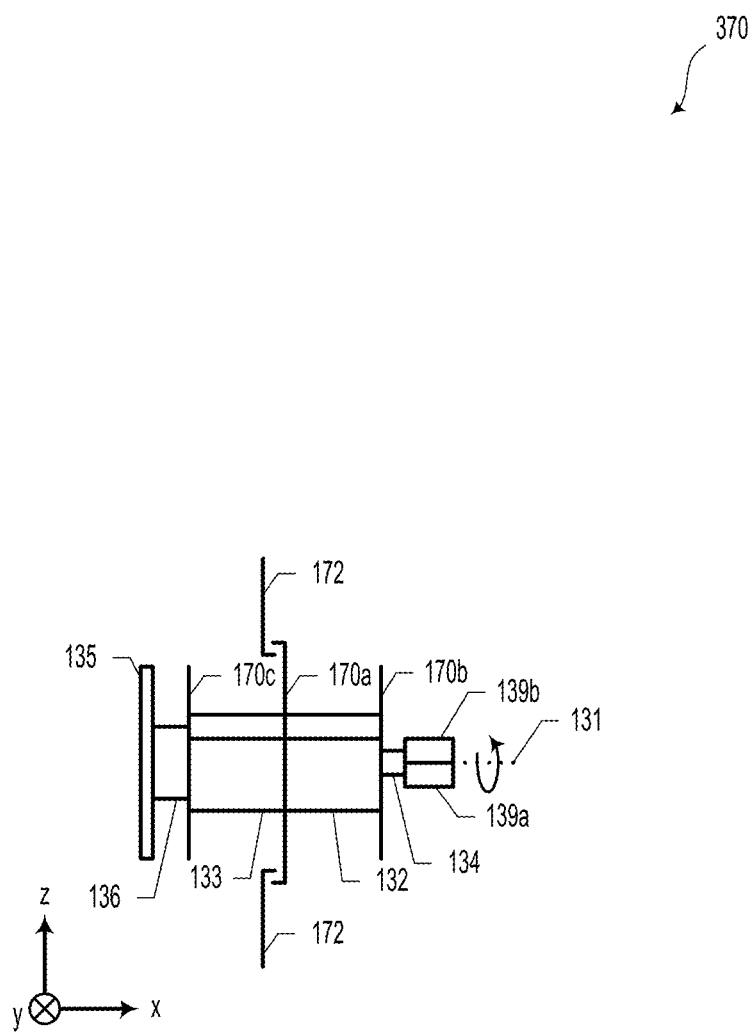
FIG. 3G illustrates a mirror assembly and baffle arrangement, according to an example embodiment.
Figure 3H:
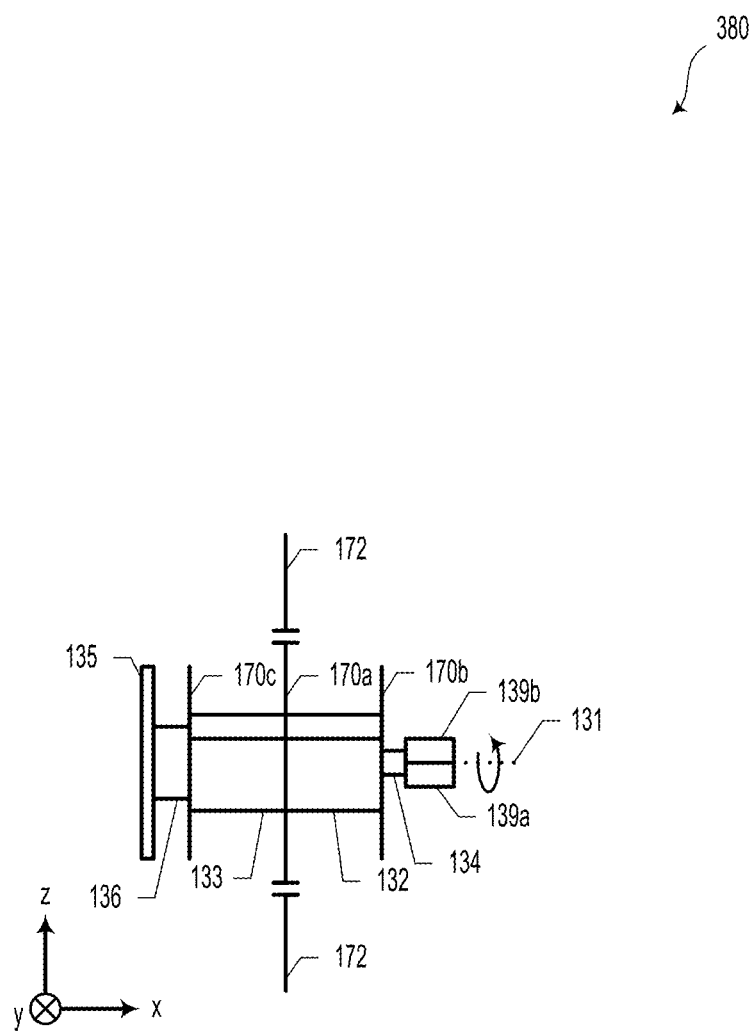
FIG. 3H illustrates a mirror assembly and baffle arrangement, according to an example embodiment.
Figure 3L:
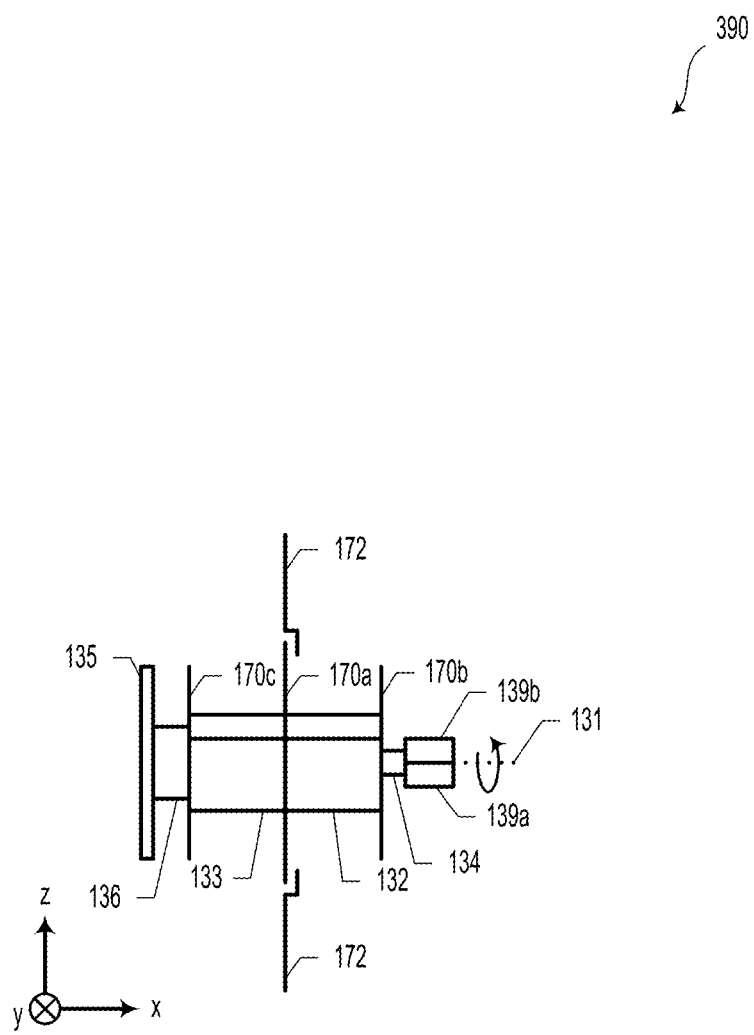
FIG. 3I illustrates a mirror assembly and baffle arrangement, according to an example embodiment.
FIG. 3J illustrates a mirror assembly and baffle arrangement, according to an example embodiment.
FIG. 3K illustrates a mirror assembly and baffle arrangement, according to an example embodiment.
Figure 3J:
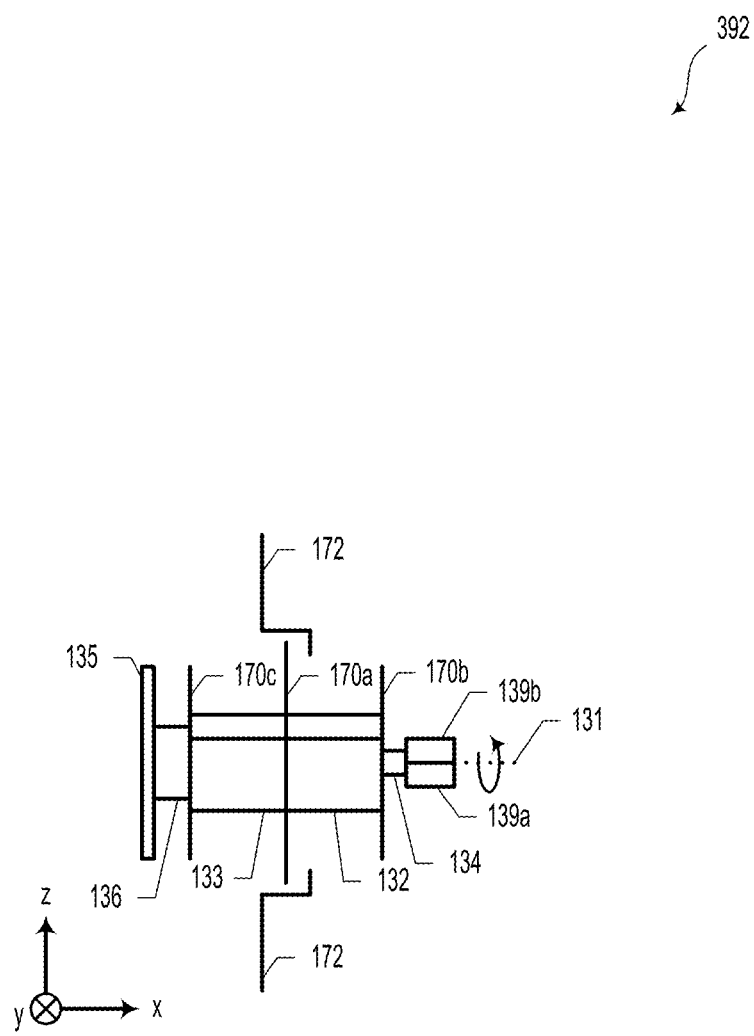
Figure 3K:
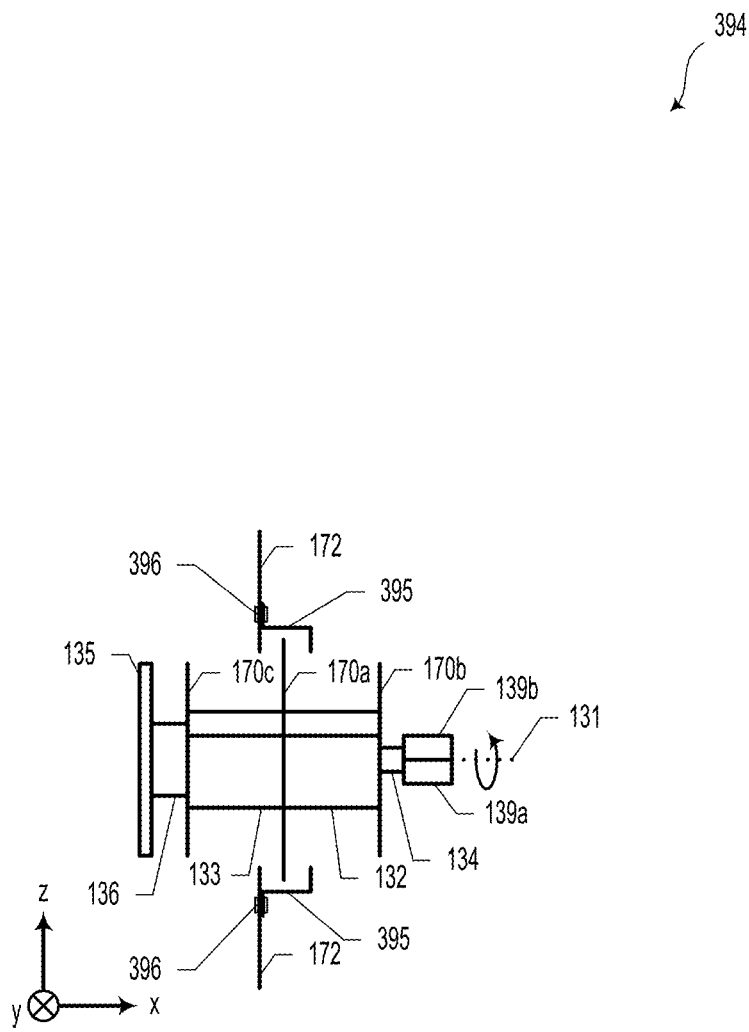

In some embodiments, the respective baffle portions could be interleaved. Additionally or alternatively, the rotatable baffle portion could be provided in an L-shape or a T-shape. As illustrated in FIG. 3G, a baffle arrangement 370 could include an L-shaped static baffle 172 and an L-shaped rotatable baffle 170a. In such a scenario, the static baffle 172 and the rotatable baffle 170a could be interleaved. Yet further, as illustrated in FIG. 3H, a baffle arrangement 380 could include a T-shaped static baffle 172 and a T-shaped rotatable baffle 170a. As illustrated in FIG. 3I, baffle arrangement 390 could include a static baffle 172 that wraps around an outer edge of the rotatable baffle 170a so as to form a tortuous path for light. As illustrated in FIG. 3J, baffle arrangement 392 could include a static baffle 172 that is partially offset with a rotational plane of the rotatable baffle 170a. The static baffle 172 could wrap around the outer edge of the rotatable baffle 170a as well. Yet further, FIG. 3K illustrates a baffle arrangement 194 that could include an additional baffle portion 395 that could be coupled to the static baffle 172 by way of a fastener 396 (e.g., a clip, a staple, etc.). In such a scenario, the combination of the static baffle 172 and the additional baffle portion 395 could provide a tortuous path for light between the transmit and receive paths in the optical system.

While some of the illustrated examples include "L- or T-shapes", the baffles may additionally or alternatively include bends or bumps so as to block light and reduce/mitigate the effects of stray light. For example, the static baffle 172 and rotatable baffle 170 could be bent, dimpled, folded, or otherwise textured or shaped so as to minimize stray light. While FIGS. 3C-3K illustrate certain baffle shapes, sizes, and arrangements, it will be understood that other baffle shapes, sizes, and arrangements are possible and contemplated. Furthermore, it will be understood that the static baffle 172 and the rotatable baffle 170a could be sized, shaped, and/or disposed with respect to one another so as to provide a desired level of optical isolation between the transmitter and receiver portions of the optical cavity 120.

Figure 4A:
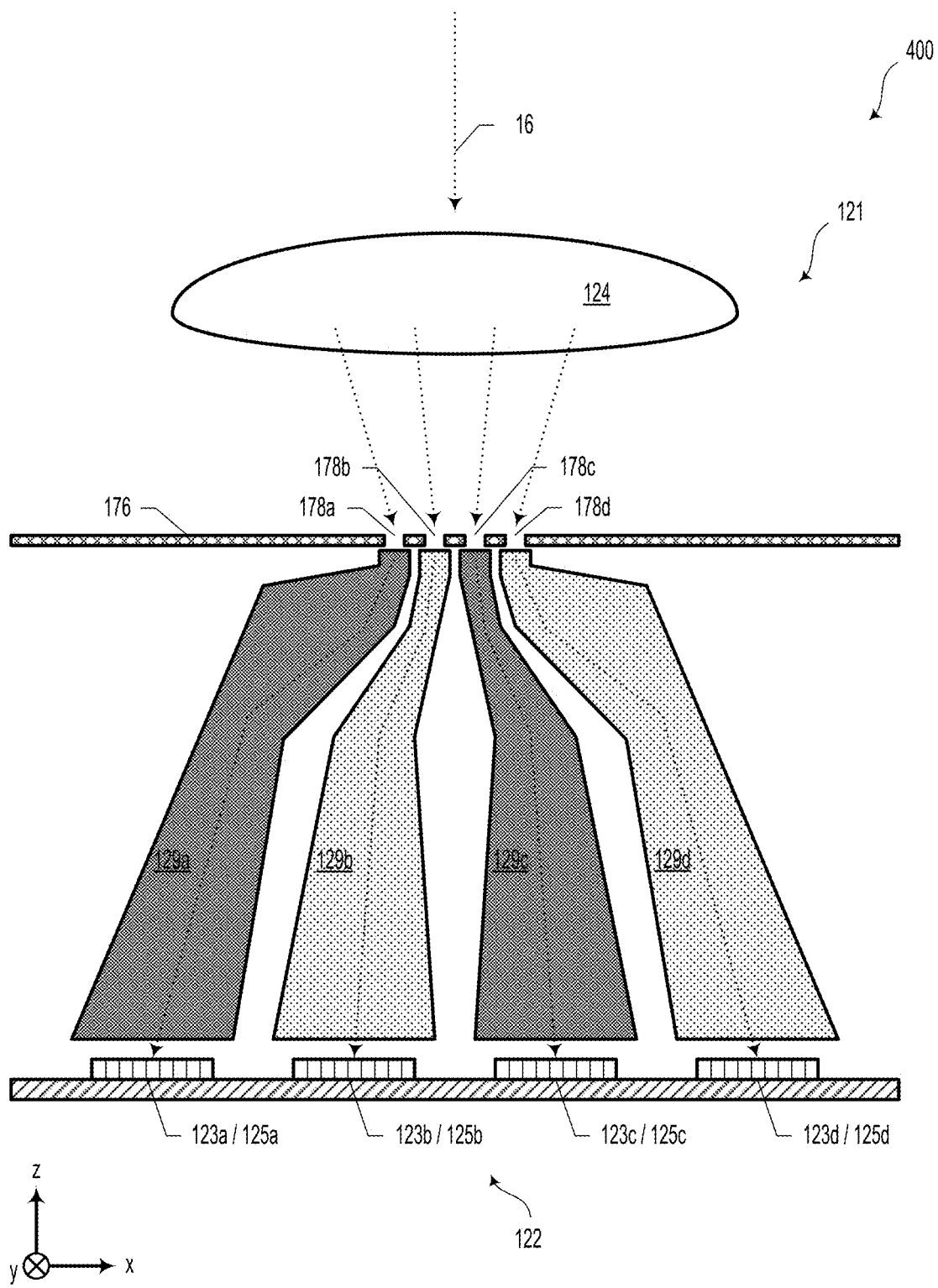
FIG. 4A illustrates a receiver, according to an example embodiment.

FIG. 4A illustrates a receiver 400, according to an example embodiment. Receiver 400 could be similar or identical to receiver 121, as illustrated and described in relation to FIG. 1. Receiver 400 could include an optical redirector device, which could be configured to receive return light 16 by way of photodetector lens 124. Receiver 400 could also include an aperture plate 176. The aperture plate 176 could include a plurality of apertures (e.g., apertures 178a, 178b, 178c, and 178d). In an example embodiment, at least one aperture of the plurality of apertures has a diameter between 150 microns and 300 microns. The plurality of apertures includes a set of openings formed in an aperture plate. In such scenarios, the aperture plate could have a thickness between 50 microns and 200 microns.

Receiver 400 includes a plurality of photodetectors 122 (e.g., primary light detectors 123a, 123b, 123c, 123d; and second light detectors 125a, 125b, 125c, 125d; etc.).

Receiver 400 additionally includes a plurality of optical redirectors 129 (e.g., optical redirectors 129a, 129b, 129c, 129d, etc.). Each optical redirector 129a, 129b, 129c, and 129d is configured to optically couple a respective portion of return light 16 from a respective aperture 178a, 178b, 178c, or 178d to at least one photodetector of the plurality of photodetectors.

In some embodiments, each optical redirector 129a, 129b, 129c, and 129d is configured to optically couple a respective portion of return light 16 from a respective aperture 178a, 178b, 178c, or 178d to at least one photodetector of the plurality of photodetectors 122 by total internal reflection.

In various embodiments, the optical redirectors 129 could be formed from an injection-moldable optical material. For example, the optical redirectors 129 could be formed from a polymeric thermoplastic optical material, such as acrylic (polymethyl methacrylate or PMMA), polystyrene, polycarbonate, Cyclic Olefin Polymer (COP), Cyclic Olefin Copolymer (COC), or various copolymers (such as NAS, a copolymer of 70% polystyrene and 30% acrylic, etc.), etc. Additionally or alternatively, some embodiments may include various polyaryletherketone (PAEK)-based materials, and/or polysulfonanones (PSU, PPSU, PES, etc) or polyetherimide (PEI). It will be understood that other optical materials are possible and contemplated.

The optical redirectors 129 could be coupled together in element pairs such that a first element pair and a second element pair are shaped to slidably couple with one another. For example, as illustrated in FIG. 4A, optical redirector 129a and optical redirector 129c could be physically coupled and could represent the first element pair. Similarly, optical redirector 129b and optical redirector 129d could be physically coupled and could represent the second element pair. As such, the first element pair and the second element pair could be configured to be assembled by sliding them together along the y-axis.

Figure 4B:
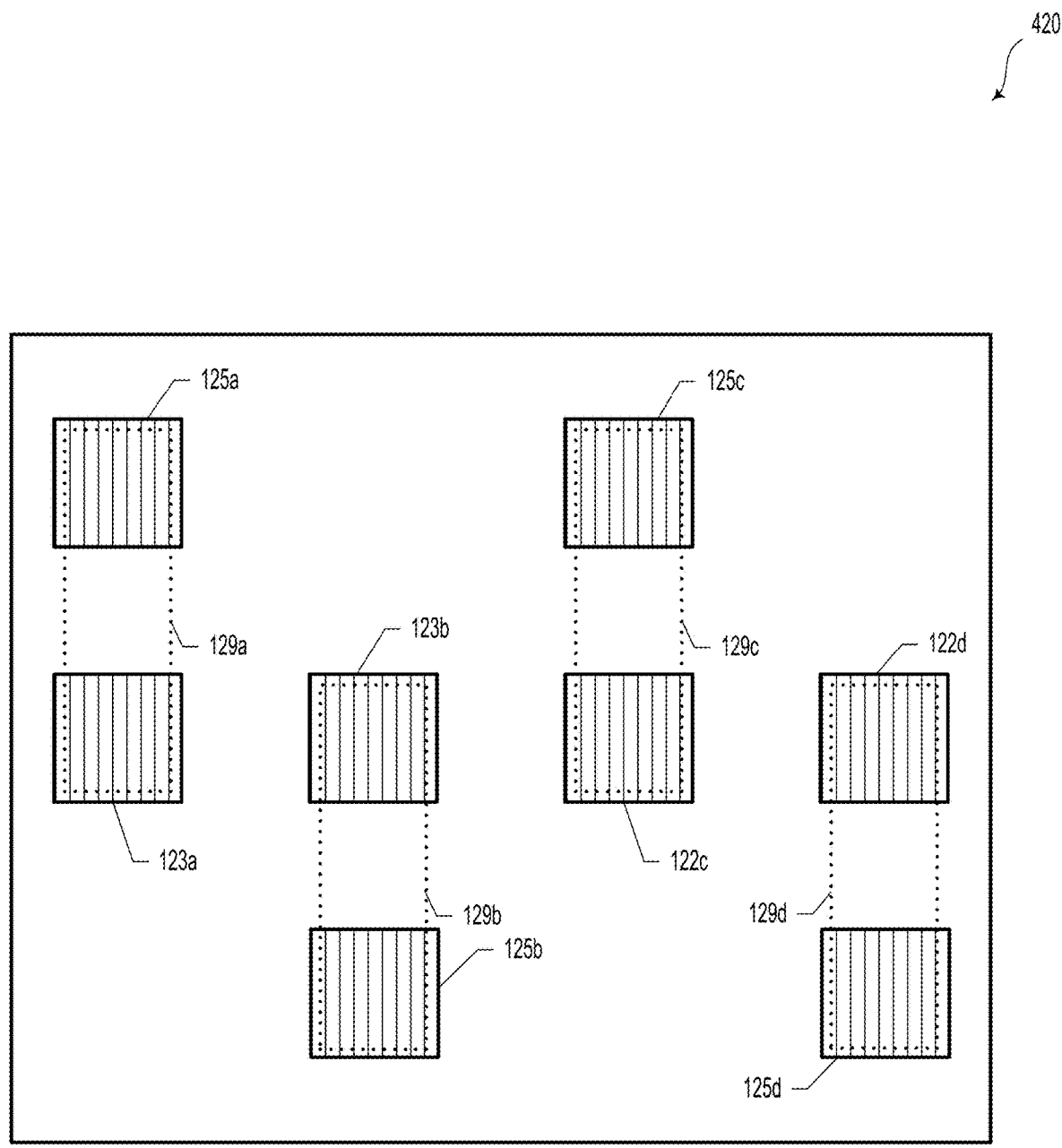
FIG. 4B illustrates an alternate view of the receiver of FIG. 4A, according to an example embodiment.

FIG. 4B illustrates an alternate view 420 of the receiver 400 of FIG. 4A, according to an example embodiment. As illustrated in FIG. 4B, the alternate view 420 could include a partial overhead view of the primary light detectors 123a, 123b, 123c, and 123d and the second light detectors 125a, 125b, 125c, and 125d. Furthermore, optical redirectors 129a, 129b, 129c, and 129d could each be optically coupled to a respective primary light detector and a corresponding secondary light detector.

While FIG. 4B illustrates a four-by-two array of light detectors (i.e., four primary light detectors in a first row and four secondary light detectors in a second row), it will be understood that other light detector geometries and layouts are possible and contemplated. For example, an alternative light detector layout could include a central row of four primary light detectors, an upper row of two secondary light detectors, and a lower row of two further secondary light detectors. Other arrangements are possible and contemplated.

Figure 4C:
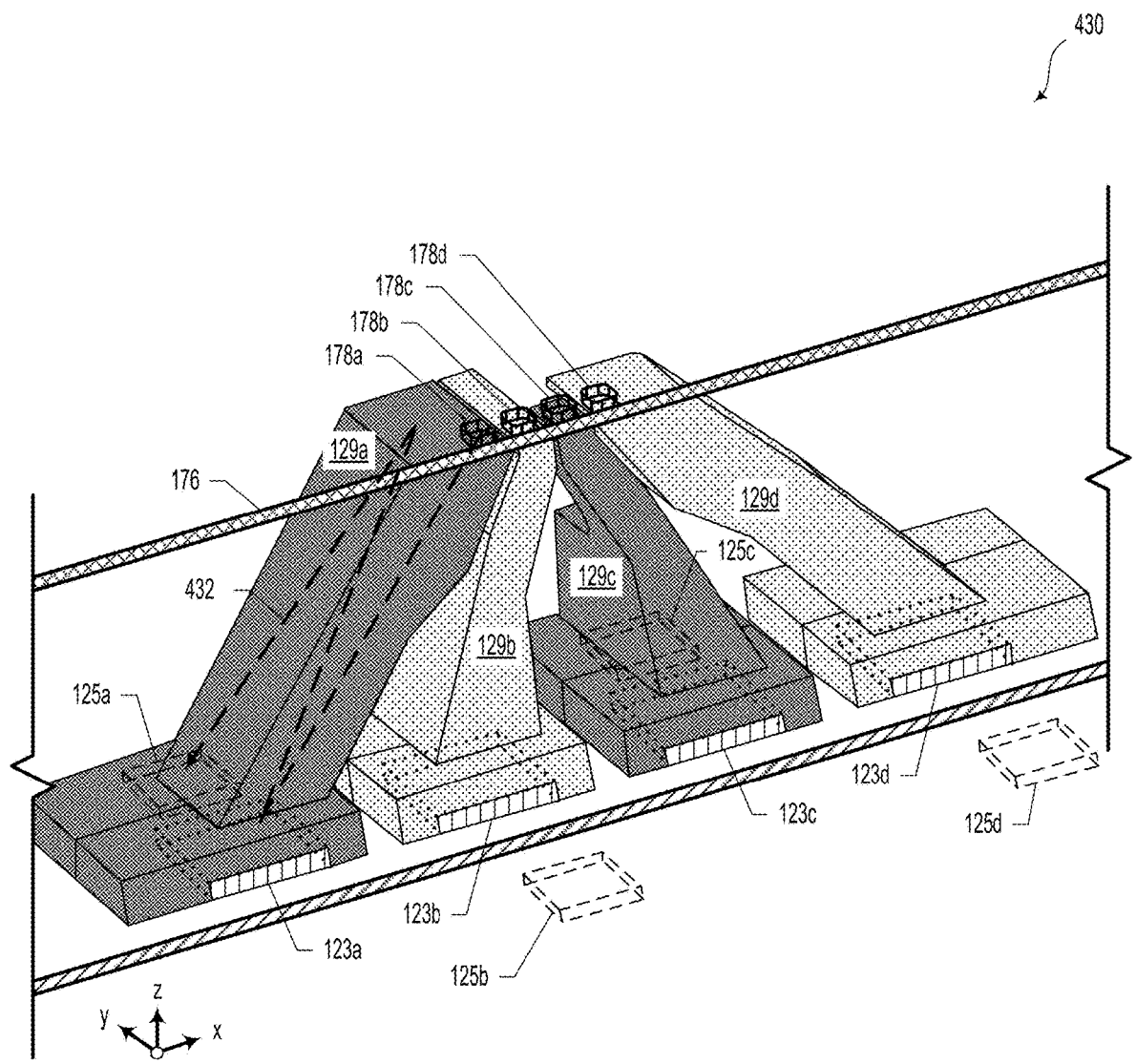
FIG. 4C illustrates an alternate view of the receiver of FIG. 4A, according to an example embodiment.
Figure 5A:
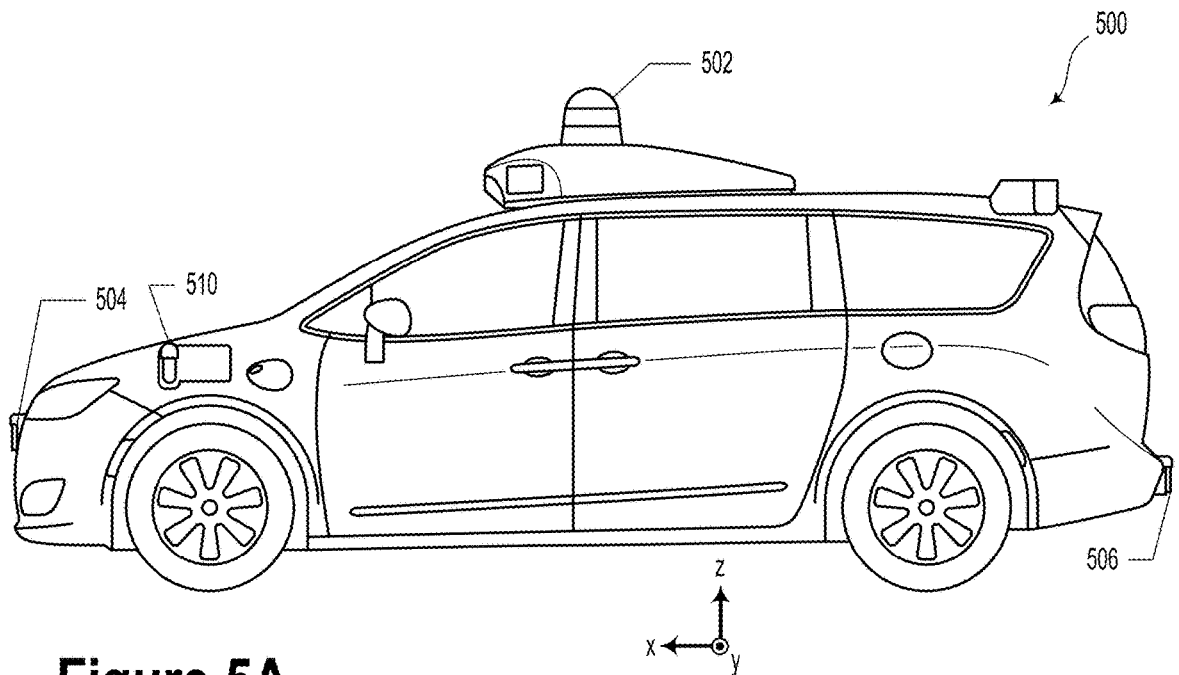
FIG. 5A illustrates a vehicle, according to an example embodiment.
Figure 5B:
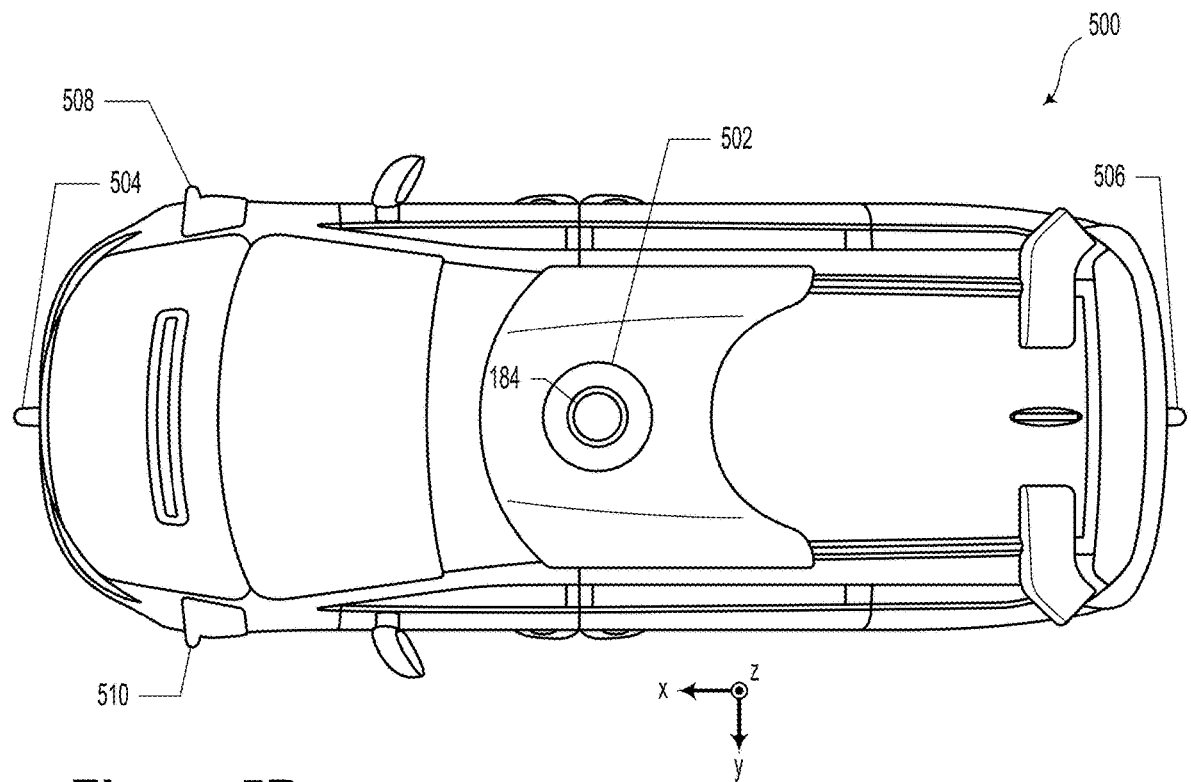
FIG. 5B illustrates a vehicle, according to an example embodiment.
Figure 5C:
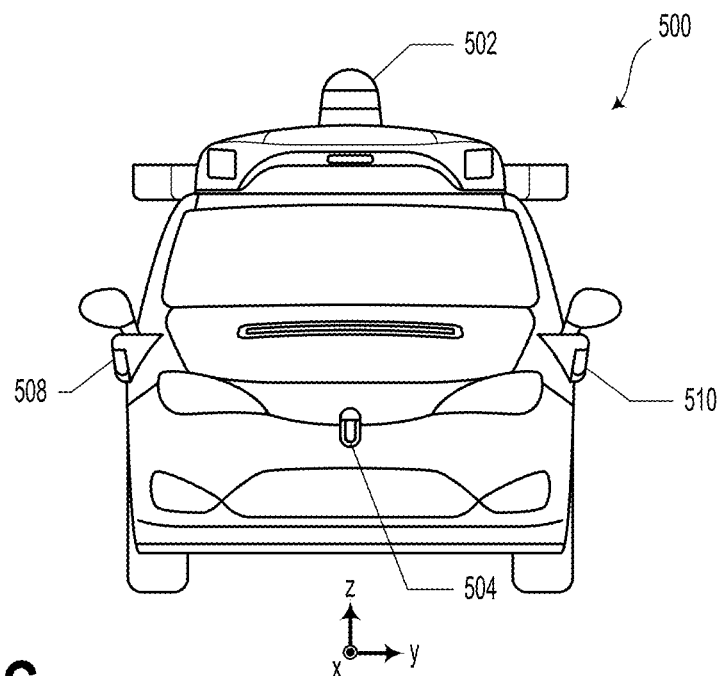
FIG. 5C illustrates a vehicle, according to an example embodiment.
Figure 5D:
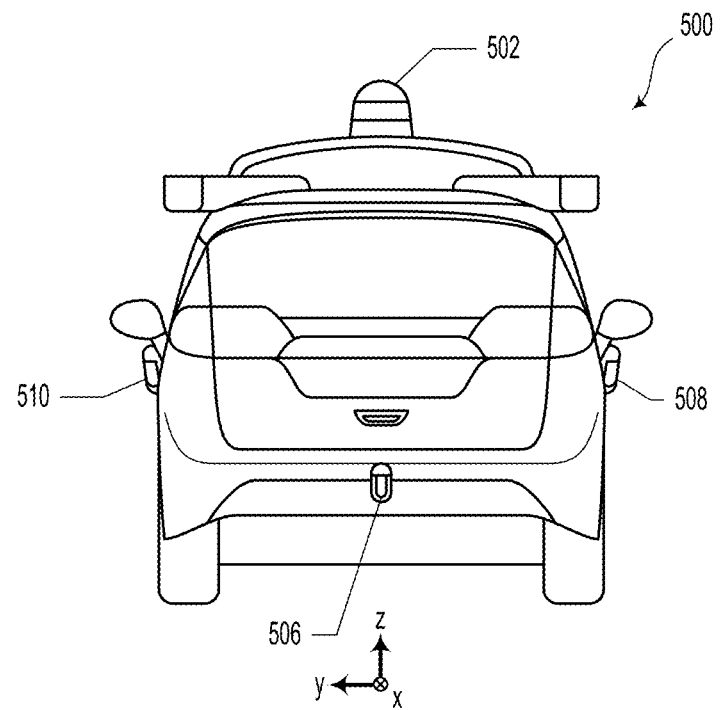
FIG. 5D illustrates a vehicle, according to an example embodiment.
Figure 5E:
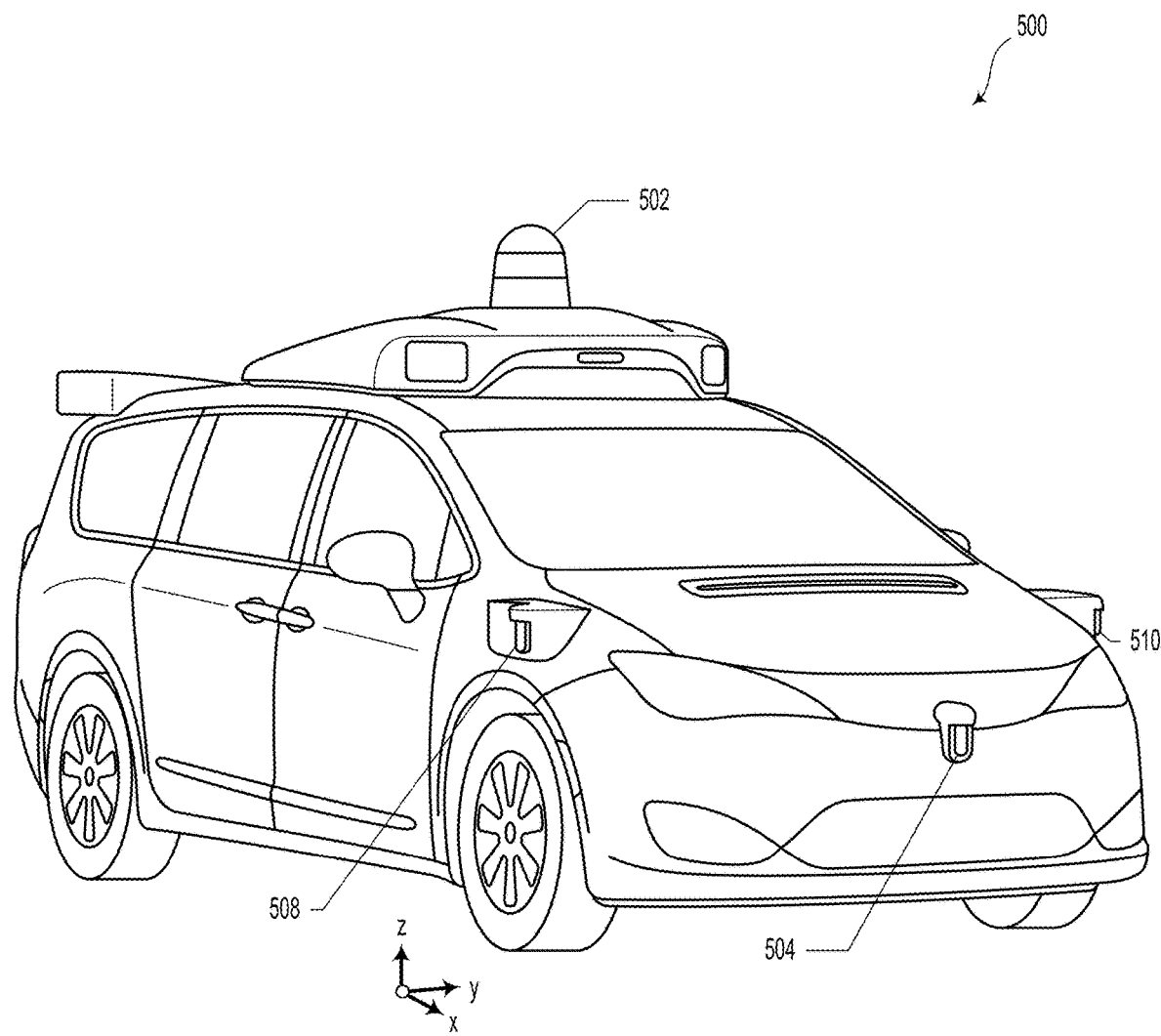
FIG. 5E illustrates a vehicle, according to an example embodiment.

FIG. 4C illustrates an alternate view 430 of the receiver 400 of FIG. 4A, according to an example embodiment. As illustrated in FIG. 4C, the alternate view 430 includes an oblique angle view of the receiver 400 and the optical redirectors 129a, 129b, 129c, and 129d. In some embodiments, incident light could enter through an aperture (e.g., aperture 178a, etc.) and interact with primary light detectors 123a. In some embodiments, a portion 432 of the incident light could be reflected from a top surface of the primary light detector 123a and subsequently reflected from a top surface of the optical redirector 129a so as to interact with the second light detector 125a. In various examples, it will be understood that various optical paths are contemplated and possible. For example, a portion of the incident light could be allowed to exit the redirector (e.g., via loss of total internal reflection, etc.), such a portion of the incident light could be provided to the secondary detector by way of an external feature, such as a reflective element.

While FIGS. 4A-4C illustrate an example embodiment, it will be understood that other optical redirector designs could be utilized so as to couple incident light between an input aperture and the photodetectors. For example, an example embodiment may include an optical redirector that substantially confines the light in a single optical plane (ignoring the divergence in the incoming beam). Additionally or alternatively, the optical redirector could be configured to direct light out-of-plane.

In some embodiments, the optical redirector could include a lensed surface. As an example, the lensed surface could be utilized on the input and/or output surface of the optical redirector. Such lensed surfaces could be beneficially configured to control the divergence of the optical beam and facilitate uniform optical coverage of the photodetector. Additionally or alternatively, at least one surface of the optical redirector could include a rippled surface, which may provide an engineered diffuser and an alternative way to control optical beam divergence.

Yet further, it will be understood that one or more redirector channels could be incorporated or combined into a single optical redirector body. In such a scenario, each redirector channel could include an entrance aperture, an exit aperture, and one or more intermediate control surfaces. The redirector channel may be made of a solid, transparent material, or it may be hollow. Both the entrance and exit apertures, as well as some or all of the intermediate control surfaces may be configured to manipulate the incoming light via refraction, e.g. a prism with one or more facets, a lens in one or two directions, an engineered diffusing pattern, or via reflection, e.g. a planar reflector with one or more facets, a curved reflector with optical power in one of two directions, or an engineered diffusing reflector, etc. In various examples, optical reflectivity may be provided by the use of total internal reflection, or via the application of reflective coatings. In one embodiment, the redirector channel could be comprised of a solid transparent material, with entrance and exit apertures oriented to be nearly normal with the incoming light, and a pair of reflective facets disposed between the apertures. In a second embodiment, the redirector channel could be substantially similar to the first example, but the exit aperture is at a significant angle with respect to the exiting light, and one of the intermediate reflectors is formed of multiple facets which serve to compress the beam pattern in one direction, thereby offsetting the elongation of the beam pattern caused by the oblique intersection between the exit aperture and the beam. In a third embodiment, the redirector channel is comprised of a solid material, and consists only of an entrance aperture and an exit aperture, and the entrance aperture is inclined with respect to the incoming light so as to refract the incident light towards the exit aperture.

FIGS. 5A, 5B, 5C, 5D, and 5E illustrate a vehicle 500, according to an example embodiment. The vehicle 500 could be operated in a semi- or fully-autonomous mode (as described elsewhere herein). While FIGS. 5A-5E illustrate vehicle 500 as being an automobile (e.g., a passenger van), it will be understood that vehicle 500 could include another type of semi- or fully-autonomous vehicle that is capable of being operated in a semi- or fully autonomous mode (i.e. with a reduced human input or without a human input) to navigate within its environment (e.g. environment 10, etc.) using sensors and other information about its environment.

The vehicle 500 may include one or more sensor systems 502, 504, 506, 508, and 510. In some embodiments, sensor systems 502, 504, 506, 508, and 510 could represent one or more lidar systems 100 as illustrated and described in relation to FIG. 1. In other words, lidar systems described elsewhere herein could be coupled to the vehicle 500 and/or could be utilized in conjunction with various operations of the vehicle 500. As an example, the lidar system 100 could be utilized in semi- or fully-autonomous driving or other types of navigation, planning, perception, and/or mapping operations of the vehicle 500.

In some examples, the one or more devices or systems could be disposed in various locations on the vehicle 500 and could have fields of view that correspond to an environment (e.g., environment 10, etc.) that is internal and/or external to the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, and/or 510 could include other lidar sensors. For example, the other lidar sensors could include a plurality of light-emitter devices arranged over a range of angles with respect to a given plane (e.g., the x-y plane, etc.). For example, one or more of the sensor systems 502, 504, 506, 508, and/or 510 may be configured to rotate or pivot about an axis (e.g., the z-axis, etc.) perpendicular to the given plane so as to illuminate an environment (e.g., environment 10, etc.) around the vehicle 500 with light pulses. Based on detecting various aspects of reflected light pulses (e.g., the elapsed time of flight, polarization, intensity, etc.), information about the environment of the vehicle 500 may be determined.

In an example embodiment, sensor systems 502, 504, 506, 508, and/or 510 may be configured to provide respective point cloud information that may relate to physical objects (e.g., objects 12, etc.) within the environment (e.g., environment 10, etc.) of the vehicle 500. While vehicle 500 and sensor systems 502, 504, 506, 508, and 510 are illustrated as including certain features, it will be understood that other types of sensor systems are contemplated within the scope of the present disclosure.

While lidar systems with multiple light-emitter devices (e.g., a light-emitter device with multiple laser bars on a single laser die, etc.) are described and illustrated herein, lidar systems with single light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment (e.g., environment 10, etc.) based on an angle of the prism mirror angle when interacting with each light pulse. Additionally or alternatively, scanning optics and/or other types of electro-opto-mechanical devices are possible to scan the light pulses about the environment.

The lidar system of vehicle 500 further includes a plurality of detectors (e.g., detectors 122).

The lidar system of vehicle 500 additionally includes a controller (e.g., controller 150) having at least one processor (e.g., processor(s) 152) and a memory (e.g., memory 154). The at least one processor executes instructions stored in the memory so as to perform operations. The operations may include any of the method steps or blocks described herein.

While FIGS. 5A-5E illustrates various lidar sensors attached to the vehicle 500, it will be understood that the vehicle 500 could incorporate other types of sensors, such as a plurality of optical systems (e.g., cameras, etc.), radars, ultrasonic sensors, microphones, etc.

In some embodiments, the one or more sensor systems 502, 504, 506, 508, and/or 510 could include image sensors. For example, vehicle 500 could include a camera that includes an image sensor configured to provide images of a field of view. In various examples, the image sensor may include a plurality of detector elements.

In such scenarios, the camera could be disposed within sensor system 502, 504, 506, 508, and/or 510. The camera can be a photosensitive instrument, such as a still camera, a video camera, a thermal imaging camera, a stereo camera, a night vision camera, etc., that is configured to capture a plurality of images of the environment (e.g., environment 10) of the vehicle 500. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points (e.g., objects 12, etc.) in the environment (e.g., environment 10, etc.) of the vehicle 500. To this end, the camera may use one or more range detecting techniques. For example, the camera can provide range information by using a structured light technique in which the vehicle 500 illuminates an object (e.g., object 12, etc.) in the environment (e.g., environment 10, etc.) of the vehicle 500 with a predetermined light pattern, such as a grid or checkerboard pattern and uses the camera to detect a reflection of the predetermined light pattern from environmental surroundings. Based on distortions in the reflected light pattern, the vehicle 500 can determine the distance to the points on the object. The predetermined light pattern may comprise infrared light, or radiation at other suitable wavelengths for such measurements. In some examples, the camera can be mounted inside a front windshield of the vehicle 500. Specifically, the camera can be situated to capture images from a forward-looking view with respect to the orientation of the vehicle 500. Other mounting locations and viewing angles of the camera can also be used, either inside or outside the vehicle 500. Further, the camera can have associated optics operable to provide an adjustable field of view. Still further, the camera can be mounted to vehicle 500 with a movable mount to vary a pointing angle of the camera, such as via a pan/tilt mechanism.

Additionally or alternatively, the vehicle 500 and/or sensor system 502, 504, 506, 508, and/or 510 could include one or more radar systems. The radar system(s) could be configured to emit radio waves to determine the range, angle, and/or relative velocity of objects (e.g., objects 12, etc.) within the environment (e.g., environment 10, etc.) of the vehicle 500. As an example, the radar system could include a transmitter configured to emit radio waves or microwaves and a receiver configured to receive information about how those radio waves or microwaves interact with the environment (e.g., environment 10, etc.) of the vehicle 500. In various embodiments, the radar system could be configured to operate in pulsed and/or continuous mode.

In some embodiments, the vehicle 500 and/or sensor systems 502, 504, 506, 508, and/or 510 could include other types of sensors such as one or more range finders, one or more inertial sensors, one or more humidity sensors, one or more acoustic sensors (e.g., microphones, sonar devices, etc.), and/or one or more other sensors configured to sense information about the environment (e.g., environment 10, etc.) of the vehicle 500. Any sensor system described elsewhere herein could be coupled to the vehicle 500 and/or could be utilized in conjunction with various operations of the vehicle 500. As an example, a lidar system could be utilized in semi- or fully autonomous driving or other types of navigation, planning, perception, and/or mapping operations of the vehicle 500. Yet further, one or more sensor types could be utilized in combination with one another (e.g., lidar and radar, lidar and camera, camera and radar, etc.).

Although not shown in FIGS. 5A-5E, the vehicle 500 can include a wireless communication system. The wireless communication system may include wireless transmitters and receivers that could be configured to communicate with devices external or internal to the vehicle 500. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Various methods of manufacturing are possible and contemplated within the scope of the present disclosure. For example, the method of manufacturing a lidar could include providing or forming a housing defining an interior space. In such a scenario, the housing includes at least one optical window. The method includes providing or coupling a rotatable mirror assembly within the interior space. The rotatable mirror assembly includes a transmit mirror portion and a receive mirror portion. The method additionally includes providing or coupling a transmitter within the interior space. The transmitter is configured to emit emission light into an environment of the lidar system along a transmit path. The transmit path includes the transmit mirror portion and at least a first portion of the at least one optical window. The method yet further includes providing or coupling a receiver within the interior space. The receiver is configured to detect return light that is received from the environment along a receive path. The receive path includes at least a second portion of the at least one optical window and the receive mirror portion. The method additionally includes providing or coupling at least one optical baffle configured to minimize stray light in the interior space. A method of manufacturing a vehicle could include some or all of the steps of the method of manufacturing the lidar.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A light detection and ranging (lidar) system, comprising:
  a housing defining an interior space, wherein the housing comprises at least one optical window;
  a rotatable mirror assembly disposed within the interior space, wherein the rotatable mirror assembly comprises a transmit mirror portion and a receive mirror portion;
  a transmitter disposed within the interior space, wherein the transmitter is configured to emit emission light into an environment of the lidar system along a transmit path;
  a receiver disposed within the interior space, wherein the receiver is configured to detect return light that is received from the environment along a receive path; and
  at least one optical baffle configured to minimize stray light in the interior space, wherein the at least one optical baffle comprises:
    a static baffle and a rotating baffle coupled to the rotatable mirror assembly; or
    a rounded edge or a bolus edge so as to reduce an amount of stray light that can pass around the optical baffle; or
    a blade strip configured to optically isolate a receiver portion of the interior space from a transmitter portion of the interior space, wherein the blade strip is configured to approach or come into direct contact with the at least one optical window or a mechanical support member separating a first optical window and a second optical window; or
    at least one transverse baffle, wherein the transverse baffle is oriented perpendicular to a static baffle, wherein the transverse baffle is configured to reduce an amount of stray light in the interior space.

2. The lidar system of claim 1, wherein the at least one optical window is formed from at least one of: borosilicate glass, plastic, or another optical material.

3. The lidar system of claim 1, wherein the at least one optical window is arranged as a split window.

4. The lidar system of claim 3, wherein the split window comprises the first optical window and the second optical window disposed adjacent to each other.

5. The lidar system of claim 4, wherein the housing comprises at least one mechanical support member separating the first optical window and the second optical window of the split window, wherein the mechanical support member is configured to provide physical protection for the split window.

6. The lidar system of claim 4, wherein the first optical window is oriented along a first plane and wherein the second optical window is oriented along a second plane.

7. The lidar system of claim 4, wherein the first optical window and the second optical window are defined by one or more straight or offset cuts in one or both surfaces of a common optical window substrate.

8. The lidar system of claim 4, wherein the first optical window and the second optical window are separated by an optically absorbing material.

9. The lidar system of claim 1, wherein the at least one optical baffle comprises the static baffle and the rotating baffle coupled to the rotatable mirror assembly.

10. The lidar system of claim 9, wherein the static baffle and the rotating baffle are configured to provide a tortuous path for stray light in the interior space.

11. The lidar system of claim 1, wherein the at least one optical baffle comprises the rounded edge or the bolus edge so as to reduce an amount of stray light that can pass around the optical baffle.

12. The lidar system of claim 1, wherein the at least one optical baffle comprises the blade strip configured to optically isolate the receiver portion of the interior space from the transmitter portion of the interior space, wherein the blade strip is configured to approach or come into direct contact with the at least one optical window or the mechanical support member separating the first optical window and the second optical window.

13. The lidar system of claim 12, wherein the blade strip comprises an elastomeric material.

14. The lidar system of claim 1, wherein the at least one optical baffle comprises the at least one transverse baffle, wherein the transverse baffle is oriented perpendicular to the static baffle, wherein the transverse baffle is configured to reduce the amount of stray light in the interior space.

15. A vehicle comprising:
at least one light detection and ranging (lidar) system, wherein the lidar system comprises:
  a housing defining an interior space, wherein the housing comprises at least one optical window;
  a rotatable mirror assembly disposed within the interior space, wherein the rotatable mirror assembly comprises a transmit mirror portion and a receive mirror portion;
  a transmitter disposed within the interior space, wherein the transmitter is configured to emit emission light into an environment of the vehicle along a transmit path, wherein the transmit path comprises the transmit mirror portion and a first portion of the at least one optical window;
a receiver disposed within the interior space, wherein the receiver is configured to detect return light that is received from the environment along a receive path, wherein the receive path comprises a second portion of the at least one optical window and the receive mirror portion; and
at least one optical baffle configured to minimize stray light in the interior space, wherein the at least one optical baffle comprises:
  a static baffle and a rotating baffle coupled to the rotatable mirror assembly; or
  a rounded edge or a bolus edge so as to reduce an amount of stray light that can pass around the optical baffle; or
  a blade strip configured to optically isolate a receiver portion of the interior space from a transmitter portion of the interior space, wherein the blade strip is configured to approach or come into direct contact with the at least one optical window or a mechanical support member separating a first optical window and a second optical window; or
  at least one transverse baffle, wherein the transverse baffle is oriented perpendicular to a static baffle, wherein the transverse baffle is configured to reduce an amount of stray light in the interior space.

16. The vehicle of claim 15, wherein the at least one optical window is arranged as a split window.

17. The vehicle of claim 16, wherein the split window comprises a first optical window and a second optical window disposed adjacent to each other.

18. The vehicle of claim 17, wherein the housing comprises at least one mechanical support member separating the first optical window and the second optical window of the split window, wherein the mechanical support member is configured to provide physical protection for the split window.

19. The vehicle of claim 15, wherein the at least one optical baffle comprises the blade strip configured to optically isolate the receiver portion of the interior space from the transmitter portion of the interior space, wherein the blade strip is configured to approach or come into direct contact with the at least one optical window or the mechanical support member separating the first optical window and the second optical window.

20. The vehicle of claim 19, wherein the blade strip comprises an elastomeric material.

* * * * *